July 22, 1941.  H. G. JOHNSTONE ET AL  2,250,108

COMPUTING SYSTEM

Filed Aug. 28, 1928  8 Sheets-Sheet 1

Inventors
Harold G. Johnstone
Charles W. Robbins
by N. A. Patterson Att'y.

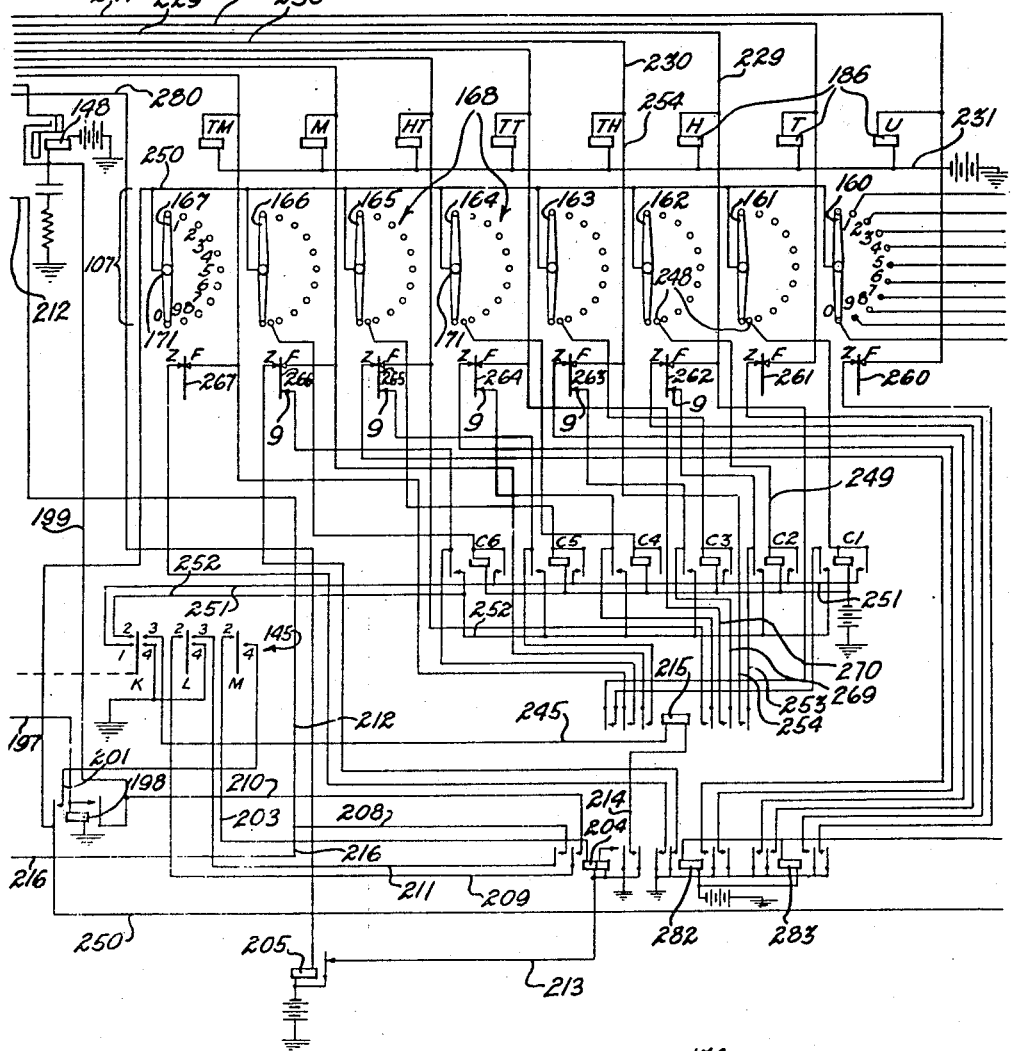
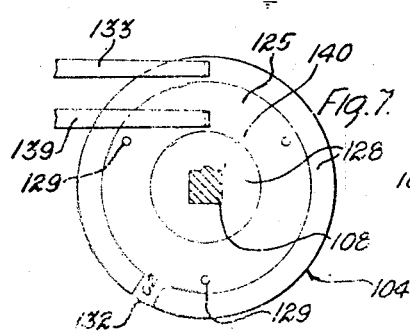
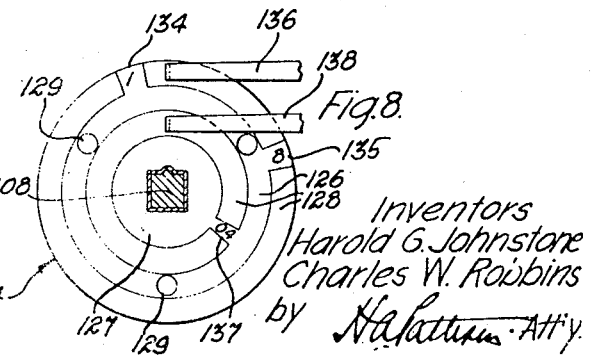

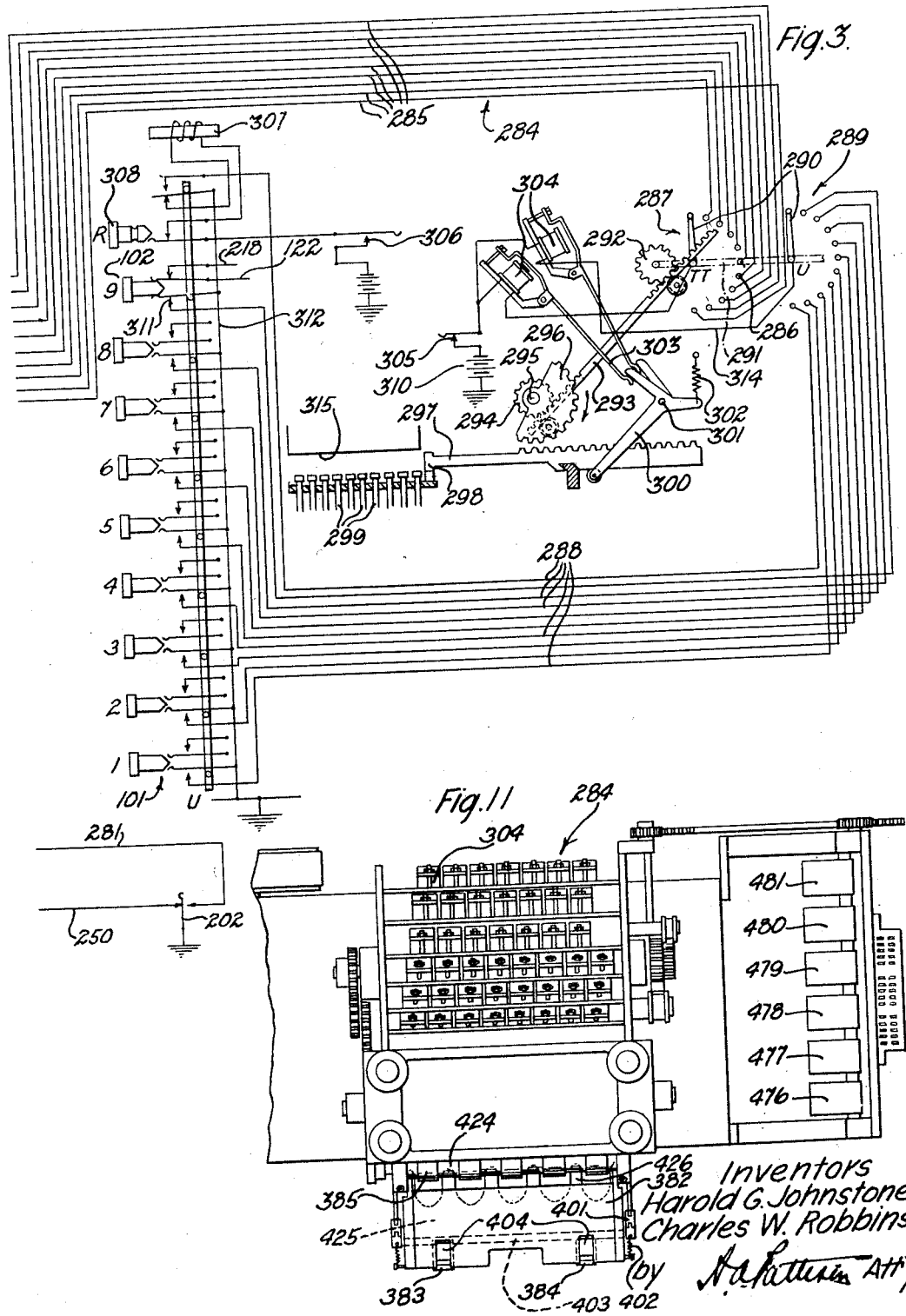

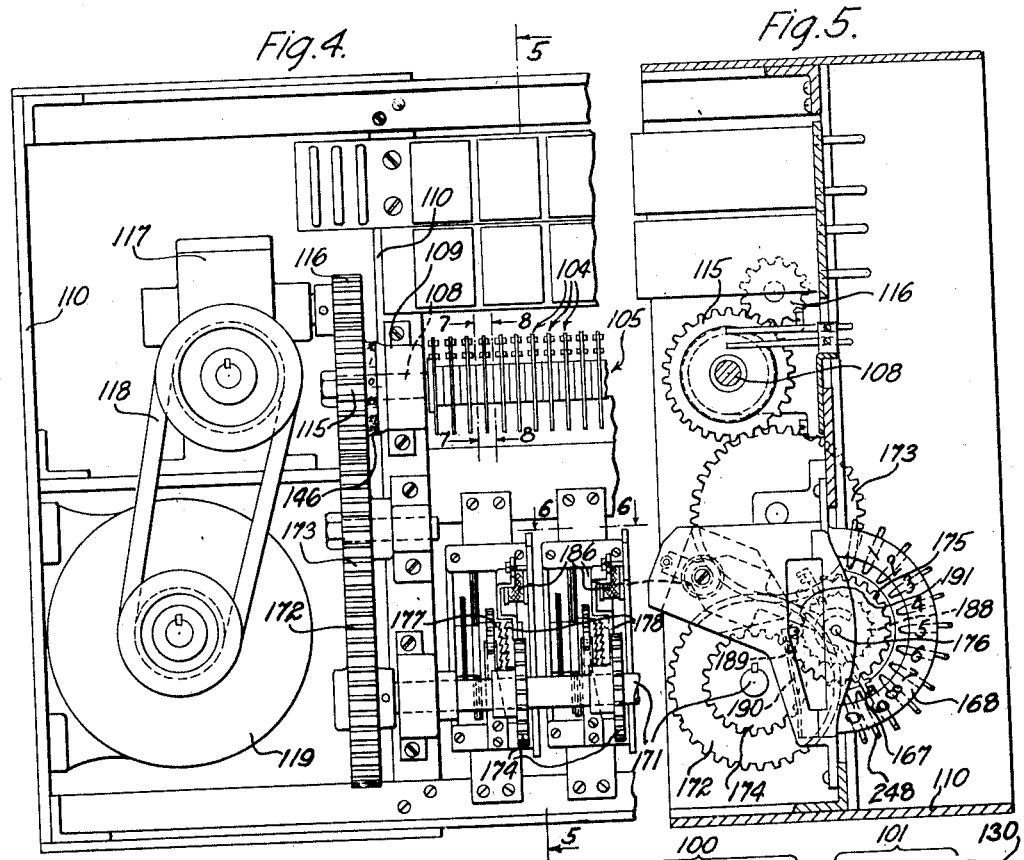
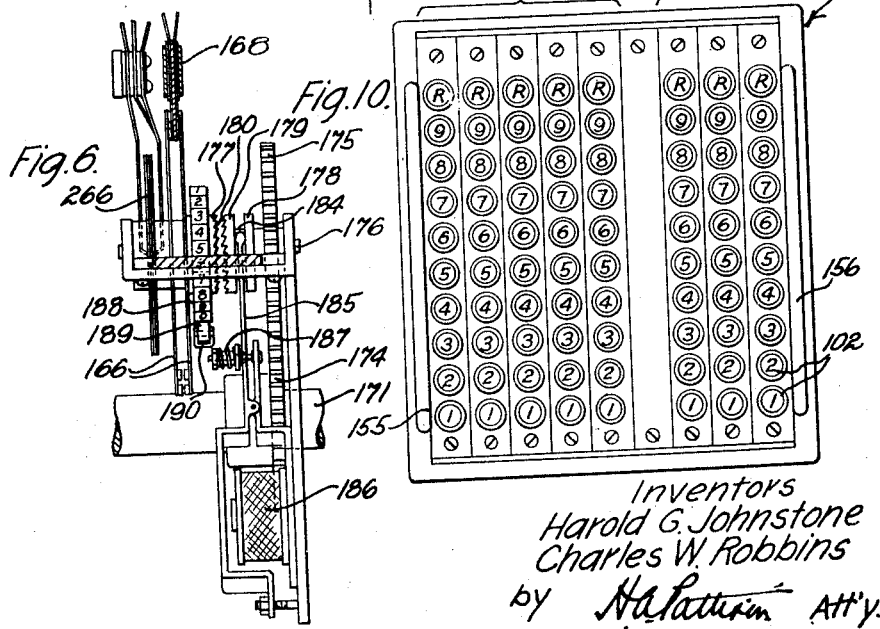

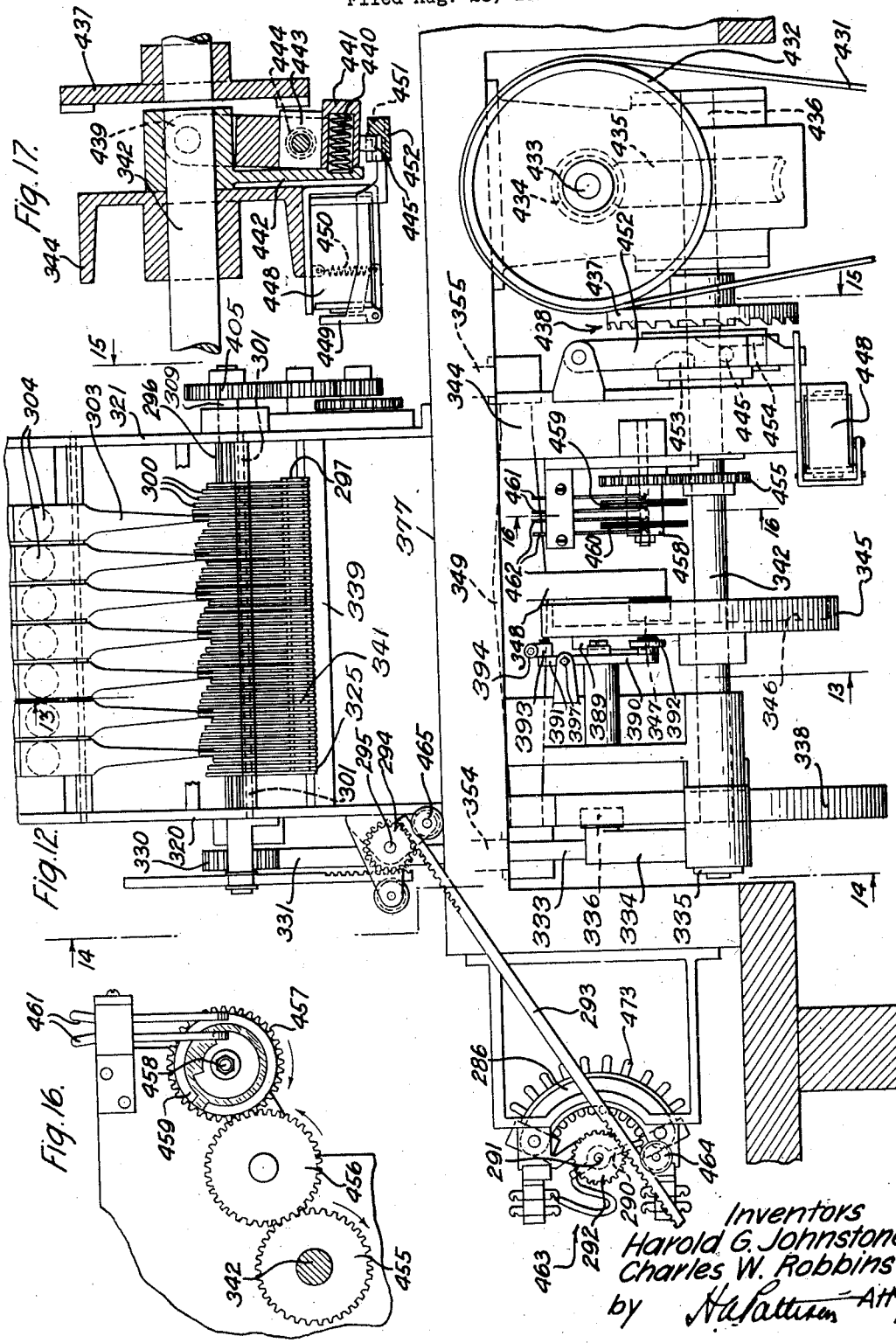

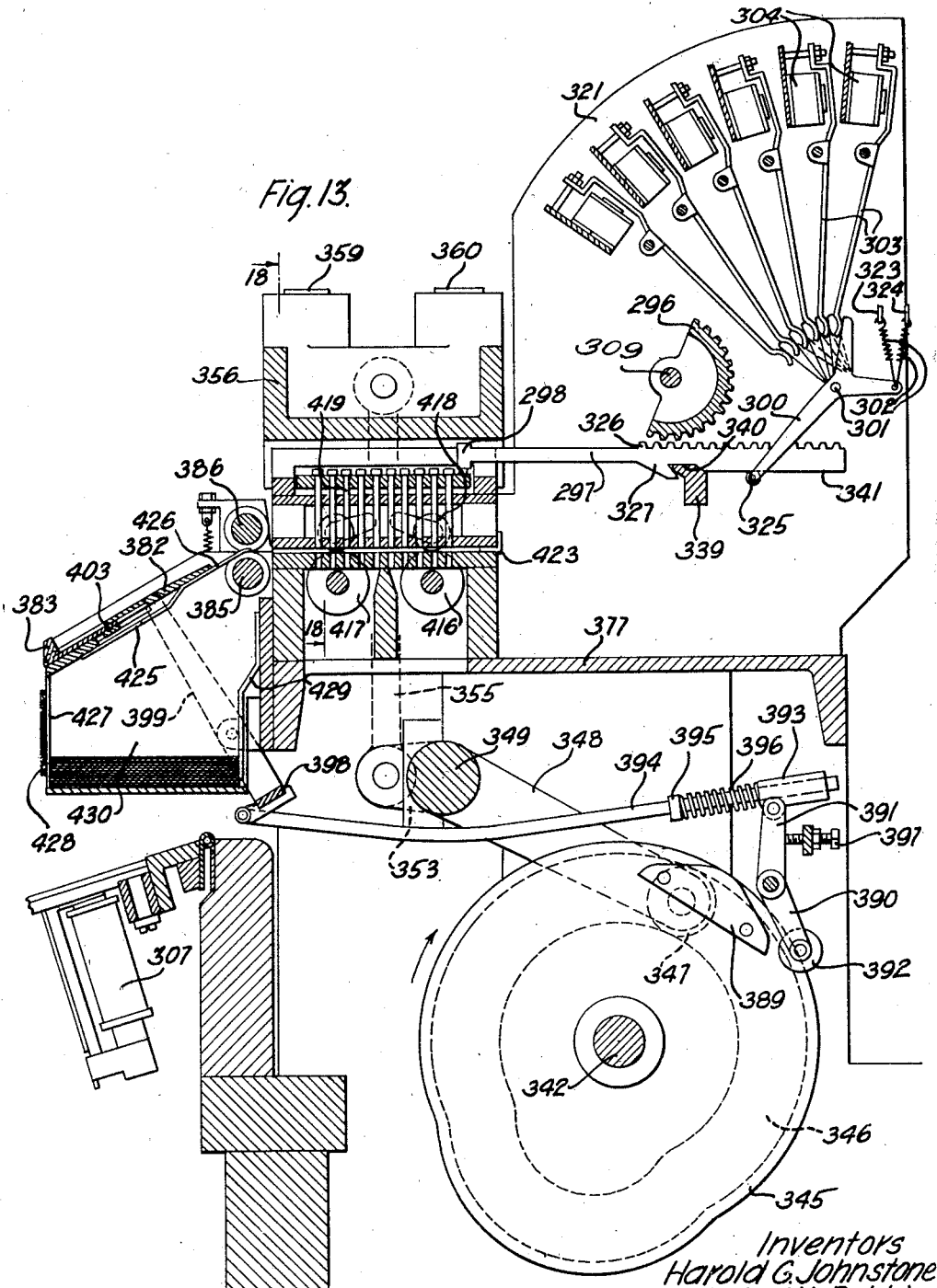

July 22, 1941.   H. G. JOHNSTONE ET AL   2,250,108
COMPUTING SYSTEM
Filed Aug. 28, 1928    8 Sheets-Sheet 7

Inventors
Harold G. Johnstone
Charles W. Robbins
by N. A. Patterson Att'y

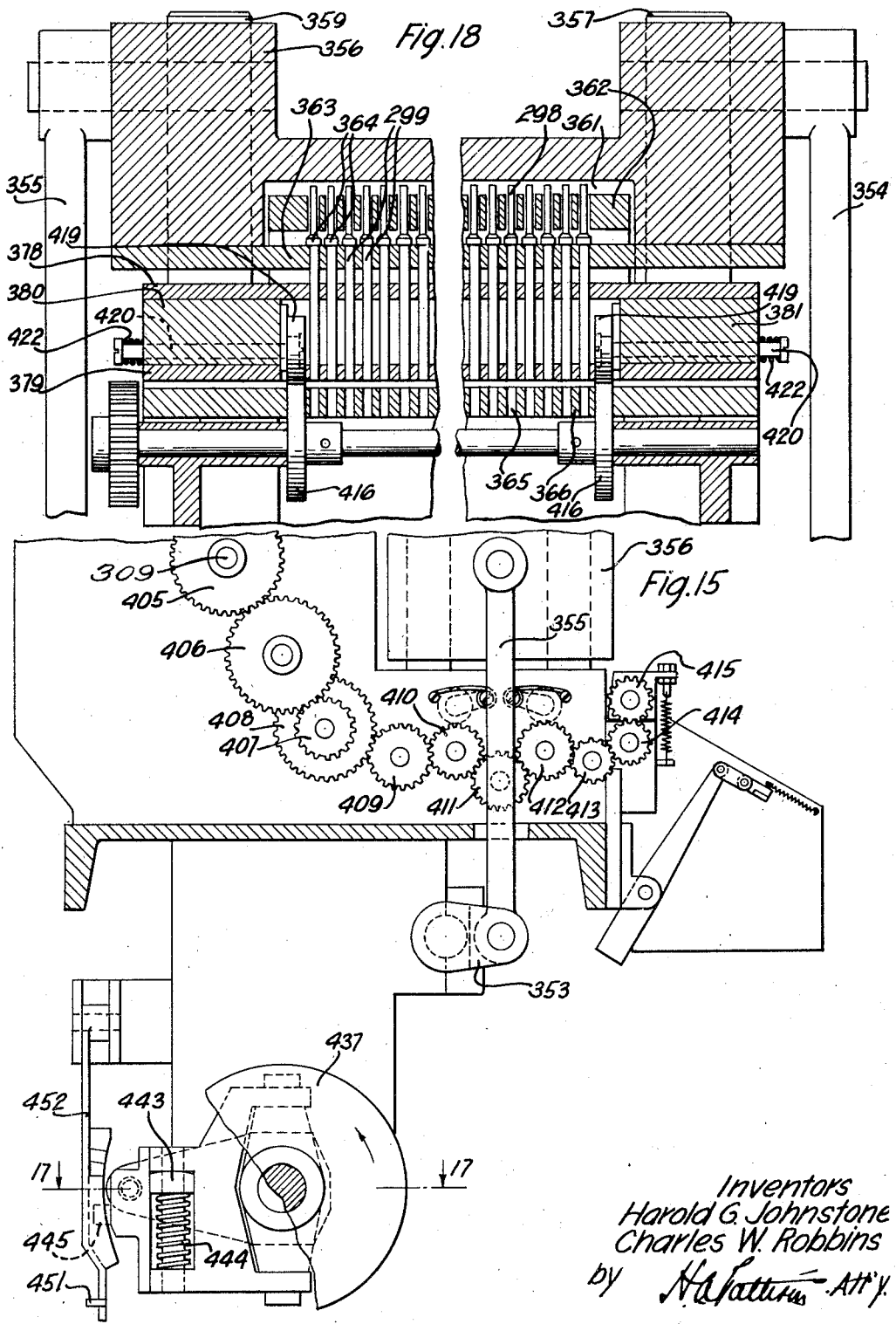

Patented July 22, 1941

2,250,108

UNITED STATES PATENT OFFICE 2,250,108

COMPUTING SYSTEM

Harold Glenn Johnstone, Oak Park, and Charles William Robbins, La Grange, Ill., assignors to Western Electric Company, Incorporated, New York, N. Y., a corporation of New York Application August 28, 1928, Serial No. 302,462

81 Claims. (Cl. 235—61)

This invention relates to computing systems, and more particularly to an electrically operated, mathematical multiplication system which is adapted to automatically indicate and record products.

In conducting the business of a manufacturing organization, it is the practice in some instances to record data pertaining to each job in a particular shop or department and at a later date transcribe the data and compute the costs incident to the manufacture of a given article. It is necessary in computing the cost of an article of manufacture to consider several factors, such as for example, the hourly rate of the operator, the loading rates or costs of operating different machines, the labor loading, the number of hours expended in the production of the particular article, etc. The compilation of these factors requires the performance of several mathematical computations. Manifestly, to perform all of the necessary multiplications even with the aid of manually operated computing devices and to manually record and convey the results to other remotely positioned stations requires considerable time and effort. The efficiency of a system for obtaining the products of the desired factors and their ultimate recording is, of course, dependent on the manual effort expended and the time required.

The principal object of the present invention is to provide an efficiently operable and flexible system for accomplishing mathematical computations and recording the results with a minimum expenditure of effort and time.

In accordance with one embodiment, the invention contemplates a system using an electrical multiplying system in which there are nine sets of nine each of electrical contact disks, each contact disk representing the product of one digit by another digit and provided with an associated contact brush so that the position of a contact on one-half of the circumference represents the unit number of the particular product and a contact on the other half the tens part. The multiplicand and multiplier are set up on keys which close certain electrical circuits; whereby beginning with units, power is fed, for each digit in the multiplier, one at a time, through the contacts on the disks through distributing brushes to an accumulating, indicating, registering or recording device, such as an electrical card punch having perforating selectors, which device can be located at a station remote from the keys. The distributing brushes transfer the electrical connections from units to tens, tens to hundreds, hundreds to ten hundreds, etc., at the proper point in each cycle. The entire product of a digit in the multiplier by the multiplicand is recorded on the accumulating device for one revolution of the contact disks. When the final product is set up in the accumulating device, the card punch electrically connected thereto is operated to actuate the perforating selectors to cause the perforation of a card corresponding to denominational digit positions, as controlled by the final product of a multiplication.

Other features and objects of the invention will be apparent from the following detailed description, reference being had to the accompanying drawings, wherein Figs. 1, 2 and 3 are circuit diagrams which, when viewed collectively with Fig. 2 to the right of Fig. 1 and Fig. 3 to the right of Fig. 2, disclose an electrical multiplying and recording system representing one embodiment of the invention;

Fig. 4 is a fragmentary front elevational view of the multiplying mechanism;

Fig. 5 is a vertical sectional view taken on line 5—5 of Fig. 4;

Fig. 6 is a fragmentary sectional view taken on line 6—6 of Fig. 4;

Figure 9:
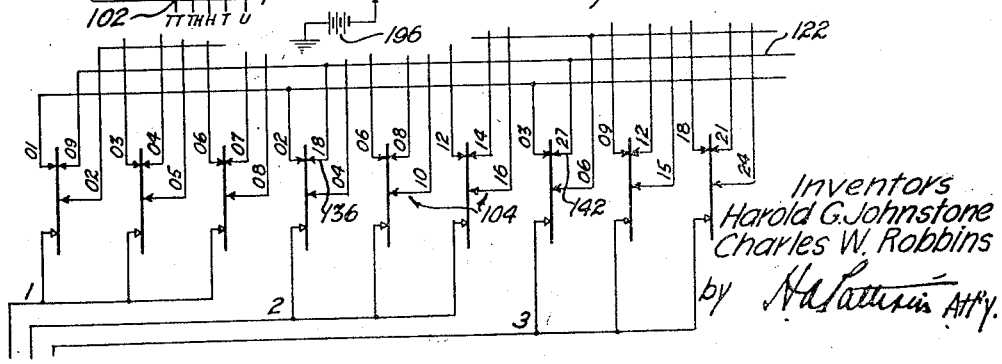
Figures 14, 19:
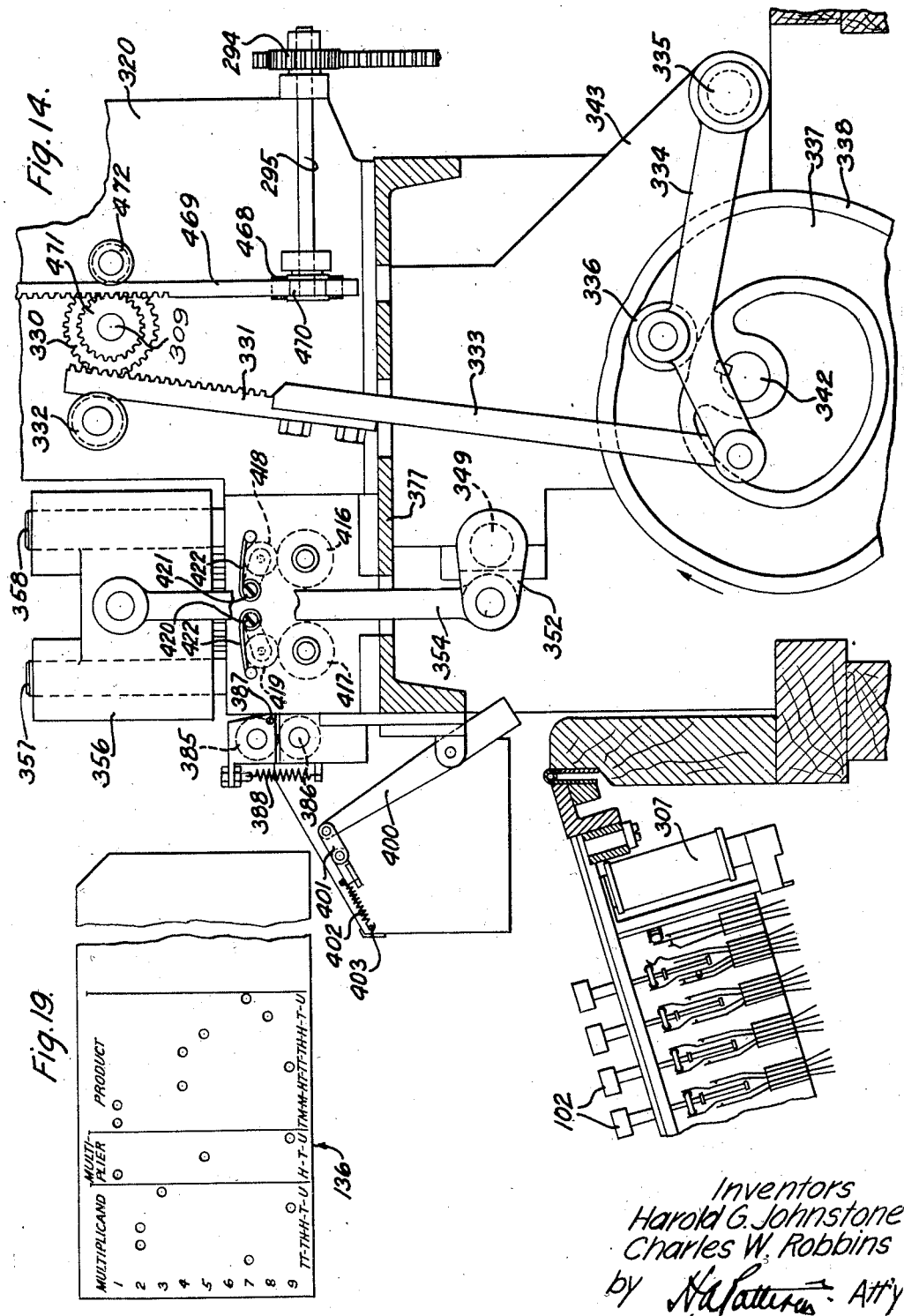

Figs. 7 and 8 are sectional views taken on lines 7—7 and 8—8, respectively, of Fig. 4 showing one of the disc-units on the multiplying commutator;

Fig. 9 is an enlarged fragmentary schematic of three of the sets of nine each of the contact discs representing the electrical multiplication system on the multiplying commutator;

Fig. 10 is a plan view of the multiplicand and multiplier key board;

Fig. 11 is a plan view of the perforating apparatus;

Fig. 12 is a rear elevation of the apparatus shown in Fig. 11;

Fig. 13 is a sectional view taken on the line 13—13 of Fig. 12;

Fig. 14 is also a sectional view taken on the line 14—14 of Fig. 12;

Fig. 15 is a sectional view taken on the line 15—15 of Fig. 12 and shows a part of the clutch operating mechanism and the drive through which power is communicated to the various parts of the apparatus;

Fig. 16 is a sectional view taken on the line 16—16 of Fig. 12 showing the arrangement of the gears through which power is communicated to sequence or contact switches;

Fig. 17 is a sectional view taken on the line 17—17 of Fig. 15,

Fig. 18 is a sectional view taken on the line 18—18 of Fig. 13 and shows in section the arrangement of the selecting bars and their associated perforating members, and Fig. 19 is a plan view of a record card in which the multiplicand, multiplier and the product thereof is expressed in the form of perforations.

Figure 1:
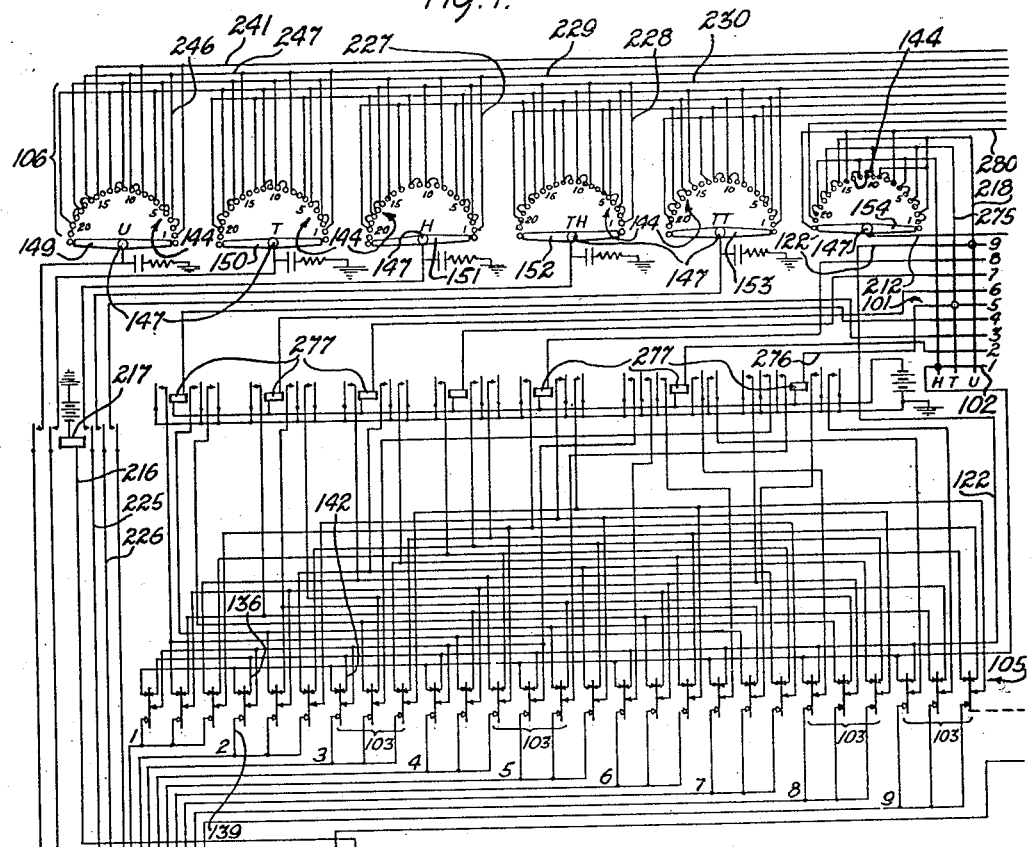

Referring to the drawings in which similar parts are designated by the same numerals in the several views, it is believed that a clear understanding of the invention will be had therefrom when considered in conjunction with the following description. In examining the circuit diagram, Fig. 3 should be arranged immediately to the right of Fig. 2 and Fig. 2 to the right of Fig. 1. Referring now to Figs. 1 and 2, the multiplicand and multiplier key banks designated generally by the numerals 100 and 101, respectively, are represented schematically by a coordinate group of lines, the vertical lines or columns from right to left denoting "units" (U), "tens" (T), "hundreds" (H), "ten-hundreds" (TH), and "ten-thousands" (TT), and the nine rows of cross lines designating the digits 1 to 9 consecutively. Each intersection of the lines represents an electrical contact, normally open, which can be closed by any suitable locking key 102 (Figs. 1 and 10) such as described and disclosed in A. D. Hargan Patent No. 1,378,950, issued May 24, 1921.

Any particular problem of multiplication can be set up on the key banks 100—101 by closing the contacts at the points corresponding to the digits in the multiplicand and multiplier. These contact closures complete electrical circuits through a multiplying commutator 105 and send electric currents to a distributor switch denoted generally as 106 which directs the currents to an accumulator 107 for properly registering or accumulating the results.

The multiplying commutator 105 comprises an electrical multiplication table in which there are nine sets, designated as 103, of nine each of electrical contact disks insulated from each other and divided into twenty-seven units of three each, designated by the numeral 104, so adapted that each contact represents one of a series of numbers representing the product of each digit times itself and each other digit running from 01 to 81. Each of the nine sets 103 of nine contact disks represents the numbers 1 to 9 consecutively and are connected to individual conductors leading to the corresponding digit in the multiplicand key bank 100. The contact disks are insulated from and secured to a rotating shaft 108 journaled in bearings 109—109 fastened to a frame 110 (Fig. 4). The shaft 108 is rotated by means of a gear 115 fastened thereto meshing with a spur gear 116 of a speed reducer 117 which is driven by a belt 118 from a motor 119 rigidly secured to the frame 110. Each unit 104 of three contact disks is also provided with an associated feed disk 140 (Fig. 7) for making connections with the digit cross lines in the multiplicand key bank. The contact disks have individual brushes and are so constructed that the position of a contact on one-half of the circumference represents the unit number of the particular product of two digits and a contact on the other half the tens part.

Figs. 7 and 8 show one of the units 104 of three disks 125, 126 and 127 representing the products of multiplying 2 by 1, 9, and 2, respectively. These disk units 104 are similar in construction to sequence switches commonly used in telephone exchange systems. The three copper disks 125, 126 and 127 are mounted on an insulator 128 and are electrically interconnected due to the fact that the disks 126 and 127 are integral and are connected with the disk 125 by means of copper rivets 129 passing through the insulator and serving to hold the elements together as the unit 104. The insulator 128 is keyed to the commutator shaft 108 and insulates the associated copper disks therefrom. Disk 125 has one radial contact 132 representing the product 02 of 2×1 to be engaged by a brush 133 at a predetermined point in the rotation of the unit 104; the disk 126 has two radial contacts 134 and 135 representing the tens digit 1, and the units digit 8 of the product 18 of 2×9 to be engaged by a brush 136; and disk 127 has a contact 137 representing the product 04 of 2×2 to be engaged by a brush 138. A feed brush 139 contacts continuously (a triangular headed arrow designates a brush which is always in contact) with a feed disk 140 which is shown in Fig. 7 as being integral with disk 125. The brushes, as shown in Figs. 1 and 9, are connected through conductors to the multiplicand and multiplier key banks. The above described unit was selected for purposes of illustration and it will be understood that the other units are of similar construction and are analogous to sequence switches used in telephone systems.

Fig. 9, the enlarged fragmentary schematic of the multiplying commutator, shows the arrangement of the multiplication table for three of the sets 103 representing the digits 1, 2 and 3. The multiplication table as illustrated follows the series of 1×1, 1×9, 1×2, 1×3, 1×4, 1×5, 1×6, 1×7, and 1×8; 2×1, 2×9, 2×2, 2×3, 2×4, 2×5, 2×6, 2×7, and 2×8; 3×1, 3×9, 3×2, etc., wherein each of the contacts represents a particular product. The multiplication table follows the usual order except that the digit 9 is placed between the digits 1 and 2 to simplify the interconnecting of the circuits. It will be clear that the multiplication tables for the numbers 4 to 9, inclusive, are followed in a similar manner throughout the length of the multiplying commutator.

Secured to the multiplying commutator shaft, but electrically insulated therefrom, is a control commutator 145 (Fig. 2) consisting of circular switches K, L and M for closing and opening various circuits at predetermined intervals throughout the multiplying cycle, the full purpose of which will be clearly understood as the description progresses.

A dial 146 (Fig. 4) attached to the commutator shaft 108 and rotatable therewith is divided or marked to indicate twenty-eight equal parts so that each division marking indicates a particular rotative position of the shaft 108 and its associated disk-units 104 rigidly mounted thereon relative to a fixed starting point. The positions one to twenty-eight are adopted to more clearly describe the sequence of events as the multiplying commutator 105 passes through one complete revolution, and it is to be noted at this point, as previously mentioned, that the units part of a product of two digits is registered during the first half revolution of the multiplying commutator; that is, positions one to fourteen, inclusive, and during the second half of the cycle, positions fifteen to twenty-eight, inclusive, the tens part is registered where the product consists of two digits (more than nine).

The distributor switch 106 (Fig. 1) is provided for transferring the electrical connections from units to tens, tens to hundreds, hundreds to ten hundreds, etc., as the multiplication progresses to complete an electrical circuit to the proper electromagnets in the accumulator or register 107. The distributor switch is similar in design to selector switches used in telephone systems and comprises in general a shaft 147, an electromagnet 148 (Fig. 2) for rotating it one step at a time, six brushes 149 to 154, inclusive, (Fig. 1) insulatively mounted upon the shaft, and arcuate banks 144 of twenty-two stationary contacts adapted for cooperation with said brushes. Five of the brushes 149 to 153, inclusive, designate and are connected by conductors to the units (U), tens (T), hundreds (H), ten-hundreds (TH), and ten-thousands (TT) columns in the multiplicand key bank 100. The sixth brush 154 applies ground progressively to one of the columns indicating units (U), tens (T), hundreds (H), in the multiplier key bank 101 as the multiplication advances to close the circuit therefrom through the multiplying commutator 105, multiplicand key bank 100, distributor switch 106, and the accumulator 107 to battery and ground.

The accumulator 107 can be remotely situated from the multiplicand and multiplier key banks to register the products of the multiplication and comprises in this embodiment of the invention eight rotatable brushes 160 to 167, inclusive, representing units (U) to ten millions (TM) columns in the final product, respectively, which brushes are adapted to make wiping engagement with an arcuate bank of contacts 168 having stationary terminals numbered 1—2—3—4—5—6—7—8—9—0. The stopping of a brush on a particular terminal designates the number marked thereon so that it will be readily understood that the accumulator 107 registers digits proportional to the length of time the brushes 160—167 are rotated.

The rotation of the accumulator brushes 160 to 167, inclusive, is accomplished by an electromagnetically operated means which will now be described; referring to Figs. 2, 4, 5 and 6 of the drawings, a shaft 171 suitably journaled on the frame 110 has a gear 172 secured thereto meshing with an idler gear 173 which in turn meshes with the gear 115 driving the shaft 108 of the multiplying commutator 105. The rotating shaft 171 has rigidly mounted thereon a plurality of spaced gears 174 adapted to drive gears 175 (Figs. 5 and 6) fastened to shafts 176 carrying loosely mounted sleeves 177 to which the brushes 160—167 are rigidly secured. Slidably keyed to and rotatable with the shaft 176 is a clutch member 178 having a serrated face 179 for engaging a companion serrated face 180 of the sleeve 177 to cause rotation thereof. The slidable and rotating clutch member 178 is provided with a groove 184 into which extends the bifurcated end of an armature 185 of an electromagnet 186 of any suitable type. A compression spring 187 is associated with the armature 185 to separate the driving clutch member 178 from engagement with the brush carrying sleeve 177 when the electromagnet 186 is deenergized. From the foregoing it will be obvious that the energizing of the electromagnet 186 will move the armature 185 thereof to compress the spring 187 and lock the serrated faces of the clutch member 178 and the sleeve 177 together to cause the rotation of its associated brush.

An index or register wheel 188 integral with each sleeve 177 has a series of twenty depressions on its periphery, which depressions are adapted to be engaged by a roller 189 mounted on a compression leaf spring 190 to center the brush with relation to the position of the stationary terminals in the arcuate bank 168. Each depression has a number engraved therein starting with 1 and running consecutively as 2, 3, 4, 5, 6, 7, 8, 9 and 0 so that there are provided two complete sets of indicating numbers on each register wheel. These numbers are so positioned on the periphery of the wheel that the depression immediately above the roller 189 indicates the number designated by its associated brush. For example in Fig. 5 the brush 167 has stopped on the terminal 9 and the operator by looking at the depression 191 immediately above the roller reads the number 9 engraved therein. The use of the two complete sets of indicating numbers on each register wheel 188 gives a rapid indication in that a digit is registered for each half revolution of an index wheel.

In order to facilitate an understanding of the working relationship of the details of the computing system and to afford a more effective means of describing many important functions thereof, such as the carry function of the accumulator and its method of simultaneously carrying tens to higher denominational orders, an explanation will be given of the steps performed in a specific example such as multiplying 72,293 by 159.

In order to accomplish this multiplication the driving motor 119 (Fig. 4) is connected to a suitable source of power (not shown) to cause continuous rotation of the multiplying commutator 105 and of the shaft 176 of the accumulator switch 107 as has been previously described. Keys 102 (Figs. 3 and 10) in the multiplicand and multiplier key banks 100—101 (Fig. 1) of a key board 130 corresponding to the numbers 72,293 and 159, respectively, are then depressed, as indicated by the circles, to close electrical circuits at those points. The operator then momentarily presses a start key 195 which closes a circuit from grounded battery 196, conductor 197, and the winding of a starting relay 198 to ground. Relay 198 upon being energized establishes a locking circuit for itself from ground through its winding and right hand contact and armature, conductor 199, and the winding of the electromagnet 148 of the distributor switch, to grounded battery. The current flowing through the distributor magnet 148 at this time is not sufficient to operate it, but it is sufficient to maintain relay 198 energized. The closure of the left hand contact of relay 198 connects brush 4 of the circular switch M of the control commutator 145 to ground, through conductor 201, conductor 250, and the back contact of clear-out switch 202. When the control commutator 145, which runs continually as a part of the multiplying commutator 105, reaches position 1, as indicated by the dial 146 (Fig. 4), a circuit is established through brushes M4 and M2, conductor 203, left hand winding of a pick-up relay 204, conductor 213 and the back contact and armature of the release relay 205 to grounded battery. Pick-up relay 204 is thereby energized and establishes a locking circuit for itself through its right hand inner contact.

The operation of the pick-up relay 204 also establishes a circuit from ground through brushes L4 and L2 of the control commutator 145, conductor 209, left hand inner contact of relay 204, conductor 210, conductor 199 to the winding of distributor switch magnet 148. The circuit just traced is closed for twenty-five degrees of rotation from position 1 of the control commutator and performs two functions: It operates the distributor switch magnet 148 advancing the distributor brushes 149 to 154, inclusive, to stationary terminals 1 in the plurality of banks 144; and causes the short circuiting of the winding of starting relay 198 to thereby open its contacts and render the relay ineffective in the circuit. The pick-up relay 204 also establishes a circuit from brush L3, conductor 211, left hand outer contact of relay 204, conductor 208, conductor 212 to brush 154 of the distributor switch 106; the pick-up relay 204 also establishes another circuit from battery through the back contact of release relay 205, conductor 213, right hand outer contact of relay 204, conductor 214, the winding of a carry relay 215, conductor 245, brushes K3 and K4 to ground. The entire operation up to this point is a preliminary or preparatory function to start the multiplying operation at the proper place in the cycle.

The beginning of the actual multiplying operation occurs at rotative position 4 of the multiplying and control commutators when brush L3 makes contact and applies ground which will hereinafter be designated as the master ground. Ground is thereby established from brushes L4 and L3 through conductor 211, left hand outer contact of pick-up relay 204, conductor 208, conductor 216, and the winding of a relay 217 to grounded battery. The operation of relay 217 closes contacts to complete individual circuits from the units (U), tens (T), hundreds (H), etc., columns in the multiplicand key bank 100 to their respective brushes 149—153 of the distributor switch 106. At the same time the master ground is supplied to the units column in the multiplier key bank 101 through brush 154, terminal 1 of its associated bank 144, and conductor 218. Contact 9 in the units column of the multiplier key bank 101 being closed due to the depression of that particular key, the master ground is continued through conductor 122 to a contact in each of the nine sets 103 of the multiplying commutator 105. This contact in each case as previously described is so cut that it is closed in the first half of the cycle, positions 1 to 14, inclusive, at a point representing the digit in the units (U) column of the product of 9 times the number of the set.

The ground from the contact 9 of the units (U) column in the multiplier key bank 101 is thus continued on through the various multiplying commutator junctions at the contacts representing the various digits of the products to the corresponding digit cross-lines of the multiplicand key bank 100. At this point the circuit from the master ground finds digit cross-lines connected through to the distributor switch 106 according to the specific problem set up on the multiplicand key bank 100. The first closure in the first half cycle is in the 2 set of the sets 103, that is, 9 times 2 which closes at rotative position 7. An illustration of the specific construction of the unit 104 having disks representing the products of multiplying 2 by 1, 9, and 2 can be had by referring to Fig. 8 of the drawings wherein the disk 126 has a radial contact 135 representing the units digit 8 of the product 18 of 9 times 2, which contact at rotative position 7 of the multiplying commutator makes a wiping engagement with a brush 136 connected to the conductor 122 (Figs. 1 and 9). As previously explained, the disk 126 is electrically connected through copper rivets 129 to a feed disk 140. This feed disk contacts continually with a feed brush 139 which is connected to a conductor 224, establishing a circuit to the digit 2 cross-line in the multiplicand key bank. In accordance with the multiplicand 72,-293 in the problem assumed, the hundred (H) and ten-hundred (TH) columns in the multiplicand key bank 100 are connected to the digit 2 cross-line, connecting the master ground at this time to conductors 225—226, the hundreds (H) brush 151 and the ten hundred (TH) 152 of the distributor 106, which brushes being on terminals 1 of the banks 144 continues the ground through conductors 227—228, conductors 229—230 to the hundreds (H) and ten-hundreds (TH) electromagnets 186 of the accumulator 107, through conductor 231 to battery. These hundred (H) and ten-hundred (TH) electromagnets 186 operate, engaging their clutches 178 (Fig. 6) and starting rotation of the hundred (H) and ten hundred (TH) brushes 162 and 163 (Fig. 2). At the same time hundred (H) and ten hundred (TH) holding relays 236 (Fig. 1) are operated over the same path and in parallel with the accumulator magnets 186. The holding relays lock through their own contacts to conductor 216, conductor 208, left outer contact of the pick-up relay 204, conductor 211 to the brushes L3 and L4 in the control commutator, thereby holding the master ground to the hundred (H) and ten hundred (TH) accumulator magnets when the contact 135 of the disk 126 opens its circuit an instant later by rotating out of engagement with the brush 136.

One position later in the cycle, position 8, a brush 142 (Fig. 9) connected to the conductor 122 finds a contact closure, representing the units digit 7 of the product 27 of 9 times 3, through one of the disk units 104 in set 3 of the multiplication sets 103, through conductor 239, contact closure between the digit 3 cross-line and the units (U) column in the multiplicand key bank, conductor 240, left outer contact of relay 217 to the units brush 149 of the distributor switch 106. Since the brush 149 is resting on terminal 1 of the associated bank 144, the circuit is continued through conductor 241, units (U) electromagnet 186 of the accumulator, conductor 231 to battery.

The energization of this units magnet 186 operates its associated clutch 178 and consequently causes the rotation of brush 160. At the same time the units (U) holding relay 236 locks through its own contact to keep the units (U) electromagnet 186 operated after the 9 times 3 contact in the multiplying commutator has been opened. At position 12 the junction of 9 times 7 finds itself connected through to the ten thousands (TT) magnet and operates and locks it. At position 14 the 9 times 9 junction operates and locks the tens (T) magnet in the same manner. One unit of rotation after this, which is position 15, the contact of the L3 brush is opened to break the master ground which has maintained all of the accumulator magnets 186 and relays 236 operated allowing the clutches 178 to release. The TT, TH, H, T and U accumulator brushes 164, 163, 162, 161 and 160 have been carried ahead 3, 8, 8, 1, and 7 spaces representing the units digit of the products of 9 times 7, 2, 2, 9 and 3, respectively.

When the commutators 105 and 145 have rotateed to position 15 the K3 brush of the control commutator 145 closes a circuit from ground, through brushes K4 and K3, conductor 245, the winding of the carry relay 215, conductor 214, right outer contact of relay 204, conductor 213, back contact of the release relay 205 to battery and thus energize and operate the carry relay 215. The operation of the carry relay 215 is for the purpose of searching for a tens carry to be described. Since only the units digits of the result of multiplying the multiplicand by the units digit in the multiplier has been registered in the accumulator 107, no brush thereof has passed over 9 and no tens carry results at this time. Also, at position 15 the L2 brush closes for 25° operating the magnet 148 and advancing the distributor brushes 149 to 154, inclusive, to terminals 2 in the banks 144. The system is now ready to proceed with the registering of the tens digit of the aforementioned multiplication.

At rotative position 18, the L3 brush again closes to the master ground and the distributor brush 154 directs the ground to the units (U) column of the multiplier key bank 101 because terminals 1 and 2 of the associated bank 144 are connected together. The previous operation of the clutches 178 is repeated except that the second half of the cycle, positions 15 to 28, inclusive, represents the tens digit of each product, that is, 8 of 9 times 9, 6 of 9 times 7, 2 of 9 times 3, 1 of 9 times 2 and 1 of 9 times 2. Distributor brushes 149 to 153 have been advanced to terminals 2 so as to connect the units (U) column of the multiplicand key bank 100 and its associated units (U) holding relay 236 to the tens (T) accumulator magnet 186, through conductor 240, distributor brush 149, terminal 2, conductors 246 and 247, the winding of the tens (T) accumulator magnet to battery; in a similar manner, the tens (T) column of the multiplicand key bank is connected to the hundreds (H) accumulator magnet; the hundreds column to the ten hundreds (TH) accumulator magnet, etc. This effects the rotation of the proper accumulator brushes to register the tens digits of 9 times the multiplicand 72,293 and is completed at rotative position 28 when the L3 brush opens the master ground in the control commutator 145. The multiplication accomplished up to this point is as shown:

| TM | M | HT | TT | TH | H | T | U | Denominations |
|----|---|----|----|----|----|---|---|---|
|    |   |    | 7  | 2  | 2 | 9 | 3 | Multiplicand |
|    |   |    |    |    |   |   | 9 | Multiplier |
|    |   | 6  | 3  | 8  | 8 | 1 | 7 | Units digits |
|    |   |    | 1  | 1  | 8 | 2 |   | Tens digits |

The action of the TT, TH and H accumulator brushes 164, 163, and 162, respectively, in the first cycle of the assumed problem affords an illustration of the method of carrying tens to higher denominational orders and will be described in detail. As already explained, the TT, TH, H, T and U accumulator brushes receive 3, 8, 8, 1 and 7, respectively, in the first half of the cycle; and in the second half of the cycle, the HT, TT, TH, H and T brushes receive 6, 1, 1, 8 and 2, respectively. Now it will be noted that the H brush 162 has received 8 and 8 totaling 16, but has stopped on terminal 6 in the arcuate bank 168. However, in passing from terminals 9 to 0, the brush 162 made contact with an added terminal 248 in the bank 168. This terminal 248 is connected to a relay C2 which is operated over the following circuit; from battery at the C2 relay, through its winding, conductor 249, through the added terminal 248, through the associated brush 162, conductor 250, the back contact of the clear-out switch 202 to ground. Upon operation, the C2 relay locks from battery through its winding, through its right contact, conductor 251, and to ground through brushes K1 and K4 of the control commutator 145 when rotating between positions 20 and 4. In the meantime, the ten-hundreds (TH) accumulator brush 163 has received digits 8 and 1, stopping upon terminal 9 of the associated arcuate terminal bank 168 and the ten-thousands (TT) accumulator brush 164 has received the digits 3 and 1, stopping upon terminal 4. As rotative position 1 arrives, the L3 brush opens the circuit from the master ground, causing the actuated accumulator brushes to stop rotating and releasing the relay 217 (Fig. 1) thereby disconnecting the accumulator magnets 186 from the multiplicand key bank 100 and the associated holding relays 236. At rotative position 1, the K3 brush operates the carry relay 215 over the path previously described, and at position 2, the K2 brush supplies ground to each of the left hand armatures of the C1 to C6 relays, through a circuit from brush K2 of the control commutator 145, conductor 252, to the left hand contact of the relays C1 to C6. Since only the hundreds (H) accumulator brush 162 has passed from 9 to 0, the C2 relay alone is operated and the ground from the K2 brush passes from the left armature of the C2 relay, conductor 253, right outer contact of relay 215, conductor 254, to the winding of the ten-hundreds (TH) accumulator magnet 186 which is operated. At rotative position 4 the K2 brush opens the above circuit, releasing the ten-hundreds (TH) clutch 178 after the ten-hundreds (TH) brush 163 has been rotated or advanced one unit to the next higher number. This is the carry tens function which transfers one digit to a register of the next higher order when the lower register passes from 9 to 0.

The mode of accomplishing a plurality of tens carrys simultaneously to the next higher denomination is illustrated by the ten-hundreds (TH) accumulator brush 163. It is to be noted at this point that the ten-hundreds (TH) brush 163 has received 8 and 1, totaling 9, at the same time that the hundreds (H) brush 162 received 8 and 8, totaling 16, so that it will be seen that the ten-hundreds (TH) brush 163 came to rest on terminal 9 before the carry operation of the tens digit 1 from the total 16 on the hundreds (H) brush.

Referring to Fig. 2, contact disks 260 to 267, inclusive, are shown on the schematic directly under each of the accumulator brushes 160 to 167, inclusive, respectively. These disks are of a construction similar to the aforementioned sequence switches and are secured to the sleeves 177 and rotate with their respective accumulator brushes as illustrated in Fig. 6. Each of the disks comprises an insulator with superimposed pieces of conducting material providing contacts at proper times between three brushes, Z, F and 9, respectively, except the disks 260, 261 and 267 which have only the brushes Z and F. The feed brush F is always in contact and the brush designated as 9 is connected when, and only when, the associated accumulator brush is standing on the 9 terminal in the companion bank 168. This arrangement establishes a circuit whereby the carry current which was connected to the ten-hundreds (TH) accumulator magnet 186 is conducted also to the ten-thousands (TT) accumulator magnet and the two accumulator magnets operate simultaneously by virtue of the fact that the ten-hundreds (TH) accumulator brush 163 was standing on the 9 terminal when the carry current arrived. Starting at the point where the ten-hundreds (TH) accumulator magnet is energized to carry the tens digit 1 of the product 16 from the hundreds (H) accumulator brush 162, the simultaneous carry circuit is traced as follows: The winding of the ten-hundreds (TH) accumulator magnet, conductor 254, brushes F and 9 of the disk 263, conductor 269, right hand middle contact of carry relay 215, conductor 270, the winding of the ten-thousands (TT) accumulator magnet, conductor 231, to battery to thereby operate the ten-thousands (TT) accumulator magnet at the same time that the ten-hundreds (TH) accumulator magnet is operated. If a succession of the accumulator brushes were standing on terminals 9 and a carry current was supplied to the accumulator magnet of the one of lowest order, all of the accumulator brushes of the higher ones would advance and indicate zero simultaneously. This carry function is effective only during that part of the cycle reserved for the tens carry, namely rotative positions 1 to 3, inclusive, and positions 15 to 17, inclusive. This is true because the carry function is controlled by the carry relay 215 which is operated only during that part of the cycle named.

During the period that the carry function was being performed, the L2 brush in rotating from positions 1 to 3 had closed a circuit previously described to energize the electromagnet 148 and advanced the distributor brushes 149 to 154, inclusive, from terminals 2 to terminals 3 in their respective banks 144. At position 4 the L3 brush makes contact with the master ground through conductor 211, left hand outer contact of relay 204, conductor 208, conductor 212, distributor brush 154, associated terminal 3, conductor 275, to the tens column of the multiplier bank 101. Since the digit 5 cross-line is connected with the tens column, the ground is extended through conductor 276, the winding of a multiplier relay 277 representing the digit 5, to battery. The operation of the relay 277 closes all of its leads to the proper junction points on the multiplying commutator 105 to ground. As the multiplier commutator rotates and makes contact for the units part of the results of 5×7, 2, 2, 9 and 3, respectively, ground from the armatures of the multiplier digit 5 relay 277 is connected to the denominational columns in the multiplicand key bank 100, through contact closures to the proper digit cross-lines, through the contacts of relay 217 to the corresponding brushes 149 to 153, inclusive, of the distributor switch 106. This switch is now on terminal 3 and the HT, TT, TH and T accumulator magnets 186 and associated holding relays 236 are operated at the proper times to accumulate 5, 0, 0, 5, and 5 on the brushes 165, 164, 163, 162 and 161, respectively, of the accumulator 107.

At position 15 the accumulator magnets 186 are released, the carry relay 215 operates and any required tens carry is made as previously described. At the same time the distributor switch 106 is advanced to terminal 4 by the L2 brush of the control commutator 145 closing a circuit from battery to ground and operating the electromagnet 148. During the next half cycle, positions 15 to 28, the tens part of each of the products of 5×7, 2, 2, 9 and 3 are registered as described above except that the distributor switch, being on terminal 4, now routes them to accumulator magnets M, HT, TT, TH and H (Fig. 2). At the end of this registry the tens carry function is again performed, the distributor switch is advanced to terminal 5 and the multiplicand 72,293 is multiplied by the hundreds digit 1 of the multiplier in a manner analogous to that described for multiplier digits 9 and 5. The distributor switch is then advanced to terminal 6 and the final tens carry is performed.

Upon the completion of this cycle, the product of 72,293 and 159 is standing in the accumulator 107 and the distributor switch 106 is advanced to terminal 7 by the L2 brush of the control commutator, closing the winding of the electromagnet 148 from battery to ground. As the L3 brush makes contact at position 4, the master ground is routed by distributor brush 154 through terminal 7 in its associated bank 144, conductor 280, the winding of the release relay 205 to battery and ground. The operation of the release relay opens its back contact and thereby removes battery from the pick-up relay 204, releasing it and restoring all parts of the system to normal, except the accumulator brushes which retain the product.

It is to be noted that no multiplier relay 277 is operated when multiplying by digits 1 or 9, but there is one provided for each of the multiplier digits 2, 3, 4, 5, 6, 7, and 8. These relays are used to prevent errors which in some instances might occur through the connecting circuit for one digit while multiplying by another if these relays or similar means were not provided; that is, the relays 277 are so arranged that two connected unused multiplier circuits cannot make electrical contact closures through the commutator simultaneously.

The terminals 1, 2, 3, 4, 5, 6, 7, 8, 9, and 0 of each bank 168 are connected to a perforating apparatus, designated generally by the numeral 284, by a plurality of conductors 285 to correspondingly numbered terminals in arcuate banks 286 (Fig. 3) of individual selecting switches 287, commonly used in telephonic communicating systems. The digit cross lines of each of the denominational columns in the multiplicand and multiplier key banks 100 and 101, respectively, are also connected by a plurality of conductors 288 to individual selecting switches 289, having correspondingly numbered terminals in their arcuate banks 286, one of which is shown in Fig. 3 wherein the units (U) column of keys in the multiplier key bank 101 is connected to the units (U) selecting switch 289. In order to avoid an unnecessary duplication and complication of circuits, only one of each of the selecting switches 287 and 289, respectively, is illustrated in the circuit schematically, but it will be understood that similar selecting switches in the perforating apparatus 284 (Figs. 3 and 11) are provided for each of the denominational columns in the multiplicand and multiplier key banks 100—101 and the accumulator 107.

Each brush or switch arm 290 of the plurality of selecting switches 287 and 289 is secured to a rotatable shaft 291 which is keyed to a pinion 292 meshing with a rack 293. This rack meshes with a spur gear 294 secured to a driven shaft 295 which is operatively associated with a segmental gear 296 driven by mechanism shown in Fig. 14, hereinafter to be described. The segmental gear, at different points in its rotation, is adapted to engage and drive at predetermined intervals a plurality of selecting bars 297 representing denominational columns in the multiplicand and multiplier key banks and the accumulator, respectively, and having an enlarged end portion 298 of sufficient size for engaging one at a time of a plurality of perforating pins 299 arranged in denominational rows or columns, each perforating pin in a column representing one of the numbers 0, 1, 2, 3, 4, 5, 6, 7, 8, and 9, respectively. The engagement of each selecting bar 297 with the driving segmental gear 296 is controlled by an individual bell crank lever 300 pivoted on a rod 301 and held in a normal position by a spring 302. An arm of the bell crank lever 300 engages an armature 303 of a selecting electromagnet 304 so that when the selecting electromagnet is energized the armature will swing the bell crank lever clockwise and elevate the particular selecting bar into engagement with the rotating segmental gear 296. The selecting bars 297 which are selected at different points in the rotation of the segmental gear through the operation of the selecting electromagnets 304 are advanced to positions with their enlarged end portions 298 in vertical alignment with the desired perforating pins. Following this selection of the perforating pins, a suitable mechanism is operated to cause the downward movement of a ram 356 common to the perforating pins for positively moving the enlarged end portions 298 and their selected perforating pins to thereby perforate apertures in a record card representing the numbers to be recorded. The ram is then moved upwardly and the segmental gear is rotated counter-clockwise to return the selecting bars to their normal retracted position.

Referring again to the specific problem presented and explained of multiplying 72,293 by 159 wherein the multiplication was completed and the product

TM  M  HT  TT  TH  HTU
1   1,  4   9   4,  587 indicated by the accumulator brushes 160 to 167, inclusive, a brief description will now be given of how that product is perforated in a record sheet or card. Upon rotation of the shaft 295, the segmental gear 296 and the spur gear 294 are rotated; the rotation of the spur gear advances the rack 293 and rotates the shaft 291 through the pinion 292 secured thereto to thus effect the clockwise rotation of the brushes 290 of the selecting switches 287 and 289. As each brush makes contact with a terminal in the bank 286 which is electrically connected to a correspondingly numbered terminal in a denominational bank 168 of the accumulator and that numbered terminal is designated by the particular associated brush of the accumulator as a digit to be recorded, a circuit is completed to energize the particular selecting electromagnet 304 and operate its associated bell crank lever 300 to bring the selecting bar 297 representing the particular denominational column into engagement with the rotating segmental gear 296 and thus advance the selecting bar 297 a distance commensurate with the time of its initial actuation. The time of actuation of the selecting bar is so synchronized with the movement of the selecting brush to cause the enlarged end portion on the selecting bar to stop at the end of the clockwise rotation of the segmental gear on the perforating pin representing the digit designated by the corresponding denominational brush in the accumulator.

The time of actuation of the selecting bars 297 in a clockwise rotative cycle of the segmental gear is dependent on the numerical value of the digit to be recorded; that is, the selecting bar to cause the recording of a digit 9 is actuated at the beginning of the rotative cycle, a selecting bar to record a digit 7 is actuated two periods of time later, a digit 4 five periods of time later, and a zero nine periods of time later. Thus it will be obvious that in recording the product 11,494,587 the selecting bar 297 representing the ten thousands (TT) columns thereof will be actuated at the start of the rotative cycle of the segmental gear 296 to have the enlarged end portion on the ten thousands (TT) selecting bars 297 stop upon the perforating pin representing the digit 9. As the selecting brushes rotate clockwise (Fig. 3) and contact with the terminals 9 the ten thousands (TT) brush effects the energization and operation of the ten thousand (TT) selecting electromagnet 304 through the following circuit: From grounded battery 310, through the winding of the (TT) electromagnet 304, the brush 290 of the ten thousands (TT) selecting-switch 287, terminal 9 in the ten thousands (TT) arcuate bank 286, one of the conductors 285, terminal 9 in the ten thousands (TT) bank 168, brush 164 of the accumulator 107, conductor 250, through the back contact of clear-out switch 202 to ground. The operation of the ten thousands (TT) selecting electro-magnet 304 elevates the corresponding selecting bar 297 into engagement with the segmental gear and the selecting bar is advanced as previously explained.

One period of time later as the selecting brush 290 contacts with the terminals 8 of the banks 286, the brush of the tens (T) finder-switch 287 completes a similar circuit from grounded battery through the tens (T) relay 304, through the brush of the tens (T) finder switch 287, terminal 8 in the tens (T) bank 286, one of the conductors 285, terminal 8 of the tens (T) bank 168, brush 161 of the accumulator 107, conductor 250 through the back contact of clear-out switch 202 to ground. The operation of the tens (T) electromagnet 304 causes the tens (T) column selecting bar 297 of the product to be actuated and advanced to select a perforating pin representing the digit 8. In like manner the units (U), hundreds (H), ten hundreds (TH), hundred thousands (HT), millions (M), and ten millions (TM) selecting bars of the product are actuated by the segmental gear in timed succession in the order named to select perforating pins representing the digits 7, 5, 4—4, and 1—1, respectively.

Likewise during the same rotative cycle of the segmental gear 296, perforating pins in denominational columns representing digits in the multiplicand and multiplier can be selected simultaneously with the selection of the perforating pins for the product thereof. As previously described the multiplicand 72,293 and multiplier 159 were set up in the multiplicand and multiplier key banks 100 and 101, respectively, by depressing keys 102 corresponding to the digits in the proper denominational columns as disclosed in Fig. 1. For purposes of simplification, only the units (U) column of keys in the multiplier key bank 101 is shown connected to a selecting switch 289. The other denominational columns of keys representing digits are similarly connected to individual selecting mechanisms and it will suffice to explain how the units (U) digit 9 of the multiplier

HTU
159 is perforated in the record card.

Referring now to Fig. 3, the digit key 9 in the units (U) column is shown depressed to connect its lower contact 311 to ground through conductor 312. The circuit is continued from the contact 311 through one of the conductors 288, terminal 9 in the units (U) selecting switch 289, through its associated brush 290, conductor 314, through the winding of a unit (U) electromagnet 304 to grounded battery. The energization of the units (U) electromagnet 304 of the multiplier causes the elevating of its selecting bar into engagement with the segmental gear 296 in the same manner and at the same time as previously described for the digit 9 in the ten thousands (TT) column of the product 11,494,587. In an analogous manner the perforating pins representing the other digits in the multiplier and multiplicand are selected at different points in the clockwise rotation of the segmental gear. At this point the segmental gear 296 stops rotating and the enlarged end portions 298 of the proper denominational selecting bars are resting on the perforating pins representing the digits in the multiplier 159, the multiplicand 72,293 and the product 11,494,587. The ram 356 is then operated by suitable means and that perforating pin which is under the enlarged portion 298 on the selecting bar 297 in each denominational column of the multiplier, the multiplicand and the product thereof is driven through a record sheet to perforate the desired information as illustrated by the perforated card 136 in Fig. 19.

As the ram 356 operates, switching contacts 305 and 306 included in contact operating member 459 (Fig. 12) are operated. The operation of switching contact 305 opens the power circuits to the electromagnets 304 during the retraction of the selecting bars 297. Immediately thereafter the operation of switching contact 306 causes the energization and operation of an electromagnet 307 to effect the restoration of the depressed keys in the keyboard 130 to normal. Also, during the same period of time the clear-out switch 202 included in contact operating member 460 (Fig. 12) is thrown to the right, thereby opening the circuit to ground from the accumulator brushes and closing another circuit from ground through conductor 281, the windings of relays 282 and 283 to battery. The operation of these relays connects ground on the Z brushes of the disks 260 to 267, inclusive, associated with the accumulator brushes 160 to 167, inclusive, respectively. The windings of the accumulator magnets 186 are connected from the Z to the F brushes of the disks to battery whereby the accumulator magnets are operated to cause rotation of the accumulator brushes and the disks. As each accumulator brush arrives at normal position, zero (0), the Z brush finds a break in the disk which opens the circuit, releasing the accumulator magnet and stopping the accumulator brush on zero. Upon the retraction of the ram 356 and the actuated perforating pins to normal position, the contact operating member 460 (Fig. 12) rotates and clear-out switch 202 is then moved to the left and the computing and recording system is put in condition to receive and record another problem of multiplication.

For a more minute description of the card punch mechanism and its mode of operation, reference is had to the following detailed description.

Referring now to Figs. 11 to 18, inclusive, the plurality of selecting electromagnets 304 are arranged in an arcuate staggered relation to permit the location of a large number of such electromagnets in a relatively small area. Each of these magnets is provided with suitable armatures 303 shown more clearly in Figs. 12 and 13 as being operatively associated with pivoted, bell crank levers 300. According to the preferred embodiment of the invention, the electromagnets 304 are mounted on rectangular shaped members which are secured to side plates 320 and 321 on the arc of a circle and are arranged in a manner such as to permit the ready, easy and quick removal of an electromagnet without disturbing any of the other electromagnets. The axis of the arc on which the rectangular shaped members supporting the electromagnets are mounted corresponds approximately with the pivotal point of the bell crank levers 300. These bell crank levers are pivoted on the rod 301 and are moved from their normal position against the action of the spring 302 individual to each bell crank lever as previously described. When the electromagnet is deenergized the spring 302 is effective for quickly returning the associated bell crank lever to normal. In order to accommodate the springs individual to the levers 300 within a given area, two mounting plates 323 and 324 are displaced from each other and are secured to side plates 320 and 321, thereby permitting the springs to be arranged in two rows, as shown in Fig. 13. Individual to each of the levers 300 is the selecting bar 297 which is engaged on its under side by a pin 325 secured to the free end of the bell crank lever 300. The selecting bars have on one surface a plurality of serrations or teeth 326, while on another surface a projection 327 is formed. The end of the bar 297 opposite to that carrying the serrations or teeth 326 is the enlarged end portion 298.

The electromagnets 304 upon being energized elevate the bar 297 through the movement of the bell crank lever 300 to a point where the teeth 326 thereof are brought into engagement with the segmental gear 296. This segmental gear 296 is mounted transversely of the selecting bars 297 (Fig. 12) and is secured to a shaft 309 which is journaled in the plates 320 and 321. The shaft 309 (Figs. 12, 13 and 14) carries a gear 330 which is adapted to be oscillated by means of a rack 331 held firmly in engagement with the gear by a flanged roller 332. The rack 331 is secured to an operating bar 333 which has its opposite end secured to one end of a lever 334 which is pivoted at 335. The lever 334 is of the shape shown in Fig. 14 and has a roller 336 which cooperates with a cam groove 337 for causing the movement of the operating bar 333 and its associated rack 331 in accordance with the rotation of a cam 338. As is clear from the arrangement of the lever 334 and the cam 338 with which the roller 336 cooperates, the rack 331 will be reciprocated and will consequently impart to the segmental gear 296 through the gear 330 an oscillatory movement. Consequently, when the segmental gear 296 is oscillated in a clockwise direction the selecting bars 297 which have been actuated in accordance with the energization of the electromagnets 304 will be moved to the left, as viewed in Fig. 13. Conversely, when the segmental gear 296 is operated in a counter-clockwise direction the selecting bars 297, which were moved to the left upon the previous oscillation of the segmental gear 296, will be retracted to their normal position.

A projection 327 is formed on the lower surface of the bar 297. This projection normally engages a somewhat similarly shaped portion of a member 339 which extends transversely of the selecting bars 297 and which functions to maintain the selecting bars in engagement with the segmental gear 296 upon their operation by the electromagnets 304 and to disengage the selecting bars from the segmental gear upon their retraction to the position shown in Fig. 13. In further explanation of this operation it will be noted that the under side of the selecting bar 297 has a depressed portion 340 in which the projecting portion of the bar 339 normally rests. When a selecting bar 297 is elevated through the operation of the pivoted lever 300 and is moved to the left through the oscillation of the segmental gear 296, it will be maintained in operative association with the segmental gear independently of the energization of the associated electromagnet 304, as the surface 341 of the selecting bar 297 now rests on the bar 339. When the selecting bar 297 is retracted due to the oscillation of the segmental gear 296 in a counter-clockwise direction, and when it reaches a position where the groove 340 is in vertical alignment with the bar 339, the lip of the bar 339 will engage the projection 327 and cause the disengagement of the selecting bar 297 from the segmental gear 296.

The cam 338 through which the rack 331 is reciprocated is mounted on a shaft 342 which extends transversely of the machine and which is mounted to depending members 343 and 344 below the shaft 309. Also rigidly secured to the shaft 342 is a cam 345 which is provided with a cam groove 346 which is engaged by a roller 347. This roller 347 is carried by the free end of an arm 348, which is integral with and mounted substantially central to a shaft 349 (Fig. 12), which carries at its extreme ends arms 352 and 353 having connected thereto vertically extending links 354 and 355. Connected to the opposite ends of the links 354 and 355 is a member or ram 356 which extends transversely of and above the enlarged portion 298 of each of the selecting bars 297 and which is reciprocated on vertical guides 357, 358, 359 and 360. As shown in Fig. 18, the member or ram 356 has a recessed portion 361 in which there is positioned a slotted member 362. This member is secured against movement, but the recess 361 is of a depth sufficient to permit predetermined vertical movement of the member or ram 356.

The ends of the selecting bars 297 having the enlarged portion 298 slide in the slots or grooves formed in the member 362 and are thereby guided when moved to the left or right (Fig. 13) depending upon the direction of rotation of the segmental gear 296. Positioned below the member 362 and secured to and movable with the ram 356 is a plate 363 having apertures arranged to receive the perforating pins 299. The perforating pins 299 are arranged in a plurality of denominational columns or rows with ten pins to each row. Each of these perforating pins is provided with a shoulder 364 which normally rests on the upper surface of the plate 363. When a selecting bar 297 is moved to the left (Fig. 13) a distance depending upon the time at which it was caused to engage the teeth of the segmental gear 296, a perforating pin in the particular row or denominational column of perforating pins to which the selecting bar 297 is common will be selected for operation. That is, for each movement of the selecting bar only one of the perforating pins 299 of the row of pins to which that particular selecting bar 297 is common will be selected for subsequent actuation, since the enlarged portion 298 thereof is of such dimension as to cover only one perforating pin 299. The actuation of the selected perforating pin 299 is effected through the downward movement of the ram 356 by the cam surface 346 which causes the perforating pins 299 to be positively depressed into operative association with aligned apertures 365 formed in a die plate 366 which is rigidly mounted to a base plate 377. Interposed between the die plate 366 and the apertured member 363 are two similarly apertured plates 378 and 379 which are secured to opposite faces of blocks 380 and 381 which are supported by the base plate 377. Inasmuch as the apertures in the plates 363, 378 and 379 are in vertical alignment with the apertures in the die plate 366, the perforating pins 299 will be accurately guided. The plate 379 is spaced from the die plate 366 a distance sufficient to allow the passage of a record sheet or card therebetween. When the cam surface 346 reaches a predetermined position in its rotation, arm 348 will be moved downwardly for causing the upward movement of the ram 356. Plate 363 being moved with the ram 356 and being engaged by the shoulders 364 on the perforating pins 299, elevates the actuated perforating pins to the position shown in Fig. 18.

As is clearly shown in Figs. 11 and 13, the machine is provided with an inclined table 382. The table 382 is arranged to receive a record sheet or card which is desired to be perforated in accordance with certain predetermined operations of the keys in the multiplicand and multiplier key banks 100—101 in the keyboard 130.

Following the placement of the record sheet or card on the tabale 382 and synchronously with the operation of the segmental gear 296, mechanism is operated for automatically advancing the sheet or card to a position below the perforating pins 299. This mechanism comprises a pair of oppositely disposed feed fingers 383 and 384 which, upon being moved, engage the sheet or card and positively advance it along the table 382 to a position where it is engaged by positively driven rollers 385 and 386. While the roller 385 is positively driven it is also pivotally mounted at 387 (Fig. 14) and held in operative association with the roller 386 by means of a coil spring 388. The feed fingers 383 and 384 are operated momentarily by means of a leverage arrangement which is reciprocated in synchronism with the oscillation of the segmental gear 296 by a cam 389 which is secured to the cam 345, but on the opposite side to the cam groove 346.

Specifically the mechanism for moving the feed fingers 383 and 384 comprises a pivoted lever having arms 390 and 391. To the arm 390 is secured a roller 392 which engages the cam surface of the cam 389 and which upon such engagement causes the movement of a collar 393 which is mounted loosely on a rod 394. Movement of the rod 394 is effected through a collar 395 rigidly secured thereto and a spring 396 which is interposed between the collars 393 and 395. Operatively associated with the arm 391 is an adjustable screw 397 which limits the movement of arm 390 and insures the proper engagement of the roller 392 with the cam 389. Secured to the end of the rod 394 opposite to the end on which the collar 393 is loosely mounted is a bar 398 which extends transversely of the table 382 and to which there is rigidly secured a U-shaped member provided with arms 399 and 400. Each of the arms 399 and 400 carries a link 401 which is normally under the tension of a spring 402 and which is secured to a transversely extending bar 403. The feed fingers 383 and 384 are secured to the bar 403, and since the top of the table 382 is slotted at 404 (Fig. 11), the fingers 383 and 384 are capable of being moved upon the movement of the rod 394 and its associated U-shaped member including the arms 399 and 400.

When the feed fingers 383 and 384 are moved in the manner just described, and provided a record sheet or card had been placed on the table 382, it will be advanced to a position where it is engaged by the rollers 385 and 386, after which the feed fingers will be retracted to a position to receive another card. These rollers (Fig. 15) are driven from the shaft 308 which carries the segmental gear 296 through a train of gears consisting of gears 405, 406, 407, 408, 409, 410, 411, 412, 413, 414 and 415. It will thus be seen that the rollers 385 and 386 which are secured to gears 410 and 415 respectively, will be driven through the train of gears just referred to in synchronism with the oscillation of the segmental gear 296 and will, during the movement of this gear in one direction, be rotated in a direction for moving the record sheet or card into alignment with the perforating pins 299, and in an opposite direction for causing the retraction of the record sheet or card upon the rotation of the segmental gear 296 in a direction opposite to that which caused the forward movement of the selecting bars 207. The advancement and retraction of the record sheet or card is also facilitated by means of the rollers 416—416 and 417—417 which are positively driven through gears 410 and 412, respectively, and which are operatively associated with spring pressed rollers 418—418 and 419—419, respectively. As shown in Figs. 14 and 18, the rollers 418 and 419 are interposed between the plates 370 and 379 having a portion thereof projecting through the plate 379 and are pivotally mounted at 420—420 and 421—421, respectively, resilient means 422—422 being provided for holding the respective rollers firmly in contact with the rollers 416—416 and 417—417. The forward movement of the card is arrested by a stop member 423 located between the die plate 366 and the plate 379. Like the rollers 385 and 386, the rollers 416—416 and 417—417 will be rotated first in one direction to advance the card and then in a reverse direction to retract the card in accordance with the oscillation of the segmental gear 296.

As shown in Fig. 11, the rollers 385 and 386 are provided with cut-out portions 424 to permit the mounting of a spring 425 which is formed with projecting portions 426 which extend into the cut-out portions 424 of the rollers 385 and 386. A card being advanced by the feed fingers 383 and 384 causes the depression of the spring 425 upon its engagement by the rollers 385 and 386. It will thus be apparent that the projections 426 of the spring 425 are directly in the path of the perforated card as it is being ejected and will cause the card to be diverted along a different path than it traversed upon its advancement to be perforated. When the card is deflected by the projections 426 of the spring 425, the edge thereof strikes a surface 427 of spring pressed members 428—428 which cooperates with a surface of member 429 to cause the card to assume a horizontal position on the bottom of a hopper 430 as shown in Fig. 13.

Power for driving the shaft 342 is communicated from an electric motor (not shown) through a belt 431, and a continuously rotating pulley wheel 432 which is secured to a shaft 433 to which there is also secured a worm wheel 434 Fig. 12. The worm wheel 434 engages a worm gear 435 which is rigidly secured to a stud shaft 436. Also secured to the shaft 436 is a serrated member 437 of a clutch mechanism designated generally by the numeral 438. Positioned opposite to and on the driven shaft 342, the shaft 436 being referred to as the driving shaft, is a pivoted member 439. The pivoted member 439 is normally urged to the right, as shown in Fig. 17 by a coil spring 440 mounted in a housing 441 in the free end of the pivoted member 439.

A projecting portion 442 of a collar secured to the driven shaft 342 forms a base away from which the spring 440 urges the pivoted member 439. The pivoted member 439 has a resilient wedge-shaped member 443 positioned therein and urged in an upward direction (see Fig. 15) by a spring 444. The pivoted member 439 also has a finger 445 at the extreme end thereof opposite the pivot point. The shaft 342 is supported by supporting member 344 upon which is also mounted an electromagnet 448 having an armature 449 which is urged away from the electromagnet by a spring 450. Formed on the end of the armature 449 is a detent 451 which engages a member 452 pivoted on the support 344.

When the electromagnet 448 is energized, the detent 451 will be moved downwardly Fig. 17 or to the left as viewed in Fig. 15, thus releasing the pivoted member 452, which, together with the pivoted member 439 will be moved to the right (Fig. 17), by the action of spring 440. Consequently the wedge-shaped member 443 will be forced to engage the serrated portion of the continuously rotating member 437. Just prior to the completion of the cycle of rotation of the pivoted arm 439, the projecting finger 445 engages a cam surface 453 mounted on the member 452 for causing the spring actuated detent 451 to engage the pivoted member 452 and restrain it against movement to the right, as viewed in Figs. 12 and 17. In the further movement of the finger 445 a cam surface 454 is engaged thereby resulting in the movement of the pivoted member 439 to the left (Fig. 17) and the disengagement of the wedge-shaped member 443 from the serrated portion of the member 437. The elements just described will remain in this position until the subsequent energization of the electromagnet 448.

In addition to the cams 338 and 345, a gear 455 is also mounted on the driven shaft 342. This gear meshes with a gear 456 which in turn meshes with a gear 457 secured to a stud shaft 458 (Figs. 12 and 16). The stud shaft 458 is mounted parallel to the shaft 342 and has mounted thereon at spaced points contact operating members 459 and 460. These contact operating members preferably consist of insulating and contacting portions which in the course of their rotation are operatively associated with contacts or brushes 461—461 and 462—462, respectively, which are mounted on opposite sides of the respective contact operating members 459 and 460. As will be described more in detail hereinafter, the contact operating members 459 and 460 control the completion of circuits extending from the contact brushes 461 and 462 and specifically function to insure that the electromagnets 304 will be energized only during the forward stroke of the selecting bars 297 and that the actuating keys of the key board 130 and the operated elements of the computing or multiplying mechanism will be restored to normal.

The completion of circuits established through the actuation of the keys in the key board 130 and the elements of the computing or multiplying mechanism is effected to the electromagnets 304 of the perforating mechanism 284 through a switching mechanism indicated generally by the numeral 463. The switching mechanism 463 consists of the plurality of arcuate banks of contacts 286 and the brush 290 individual to each bank of contacts 286. Rotation of the brushes 290 which is in synchronism with the oscillation of the segmental gear 296 is effected through the gear 292 which is secured to shaft 291 upon which the brushes 290 are mounted. The rack bar 293 having teeth at each end cooperates with gears 292 and 294 and is held in this position by flanged rollers 464 and 465. The gear 294 is mounted on the shaft 295 which also carries a gear 468 (Fig. 14). Meshing with the gear 468 are the teeth of a rack bar 469 which is held in operative association therewith by a flanged roller 470. The upper end of the bar 469 has teeth formed at right angles to the surface at which the teeth engage the gear 468 are formed, which teeth engage a gear 471 which is secured to the shaft 309. Intermeshing of the teeth formed on the upper part of the bar 469 is also effected by means of a flanged roller 472. From this description of the switching mechanism 463 it will be seen that circuits which are connected with the contacts 473 will be progressively completed upon the rotation of the brush 290 individual to the bank of contacts including the particular contacts connected with the actuated keys of the key board 130 or the elements of the computing or multiplying mechanism which are at that particular time operated.

In further explanation of the switching mechanism referred to generally by the numeral 463, the small rectangles in the upper right hand corner of Fig. 11 designated by the numerals 476, 477, 478, 479, 480 and 481 are intended to indicate the location of switching mechanism similar to that designated by the numeral 463. However, for the sake of clarifying the drawings the details of the switch mechanism in this particular figure have been omitted. Contained in each of the rectangles 476 to 481, inclusive, are a plurality of arcuate banks of contacts with a rotatable brush individual to each bank of contacts. As previously mentioned, the perforating mechanism includes a plurality of electromagnets 304. These electromagnets are connected to the brushes of the respective switching mechanisms and are energized momentarily upon the passage of the brush individual thereto over a contact in the arcuate bank of contacts which is at that particular instant connected with battery either directly through the contacts of a depressed key in the multiplicand and multiplier key banks 100—101 of the key board 130 or the operating elements of the multiplying mechanism and the contact controlling switch 459.

In further explanation of the key board 130 it is to be noted that on opposite sides thereof there are positioned two elongated members 155 and 156 which function to control various starting operations of the apparatus. For example, the member 155 through suitable contacts associated therewith, when depressed, causes the closure of the start key 195 in circuits extending to mechanism for setting into operation the computing or multiplying mechanism. Likewise, the member 156 serves to control suitable contacts and consequently the closure of electrical circuits extending to apparatus for initiating the operation of the elements constituting the perforating mechanism indicated generally by the numeral 284. Each of the denominational columns or rows of keys representing the multiplicand 100 and multiplier 101 in the key board 130 is provided with a member common to a plurality of the keys for maintaining the keys in an actuated condition once they are depressed as disclosed in the Hargan patent previously mentioned. For the purpose of restoring the actuated keys to normal an electromagnet 307 operatively connected to the member common to the keys has its operating winding connected to a suitable control circuit, which, when closed, causes its energization and thereby the restoration of the depressed keys to normal. A repeat key 308 in each row of the keys when depressed prevents the restoration of the keys associated therewith. It will also be noted that there is no zero key provided in the rows of keys on the key board. However, if it is desired to perforate an aperture in the card in the position allocated to zero, no key need be depressed and the perforation of zero will be automatically accomplished through the contacts of the key structure shown diagrammatically in Fig. 3. Inasmuch as the details of the key construction do not constitute a part of the present invention, a detailed description of the construction and operation of this part of the mechanism is believed to be unnecessary.

What is claimed is:

1. In an electrical computing system, means operable for setting up digits, a source of electrical energy, a computing means including elements representing computations of a plurality of digits, and means for completing circuits through all the operated setting up means and computing means and the source of electrical energy to transmit impulses representing the result of a computation.

2. In an electrical computing system, means operable for setting up digits, a source of electrical energy, a plurality of movable elements, each representing a computation of two digits, circuits connecting all of the setting up means with the elements, and means for actuating the elements to complete certain circuits as controlled by the operated setting up means to transmit electrical impulses representing the result of a computation.

3. In an electrical computing system, a source of electrical energy, means for setting up a multiplicand, means for setting up a multiplier, a continuously rotating multiplying device, circuits for connecting the multiplicand and multiplier setting up means through the multiplying device to the source of electrical energy, and means for distributing into proper denominational circuits the electrical currents representing the products of the multiplication received from the circuits through the multiplying device.

4. In an electrical multiplying system, means for setting up a multiplicand and a multiplier, a multiplying commutator, electrical circuits associated therewith, a source of electrical energy, and means for rotating the commutator continuously to close certain of the circuits through the multiplicand and multiplier setting up means to the source of electrical energy to effect a multiplication.

5. In an electrical computing system, means for setting up a multiplicand and a multiplier, a source of electrical energy, a rotating electrical multiplication table, and means for completing circuits through the electrical multiplication table, and multiplicand, and multiplier setup means to transmit electrical impulses representing the product of the multiplication.

6. In an electrical computing system, a source of electrical energy, means for setting up digits, a computing commutator having elements representing computations of a plurality of digits, a plurality of circuits connecting the setting up means with the elements on the commutator, means for rotating the commutator to complete the circuits closed by the setting up means to transmit electrical impulses representing the result of a computation, means for routing the electrical energy into proper denominational columns, selecting means controlled by the electrical impulses, a plurality of perforating members cooperating with said selecting means, and means for actuating the selecting means to select the perforating members whereby the result of the computation is perforated in a statistical record card.

7. An electrical multiplying device comprising setting elements for the multiplier and multiplicand, an electrically-controlled accumulator, and means moved through a fixed cycle for routing accumulator-controlling circuits through the multiplier and multiplicand setting elements to thereby control the actuation of said accumulator to accumulate the product.

8. In a multiplying machine, an accumulator, electrical controlling means for said accumulator, contact-making means having multiplication table characteristics for controlling said accumulator controlling means, means for rendering operable said contact-making means, and means for timing the operation of said contact-making means.

9. In a multiplying machine, an accumulator, electrical control means therefor, a plurality of electric contacts associated with said control means for rendering the same operative, means for differentially interconnecting said contacts to the control means for determining the effect thereof upon said control means, and multiplier and multiplicand setting-up contacts for controlling the completion of circuits through the contacts closed by said interconnecting means, said control by the multiplier and multiplicand setting up contacts being determined by the closure thereof.

10. In a device of the character described, a plurality of multiplier keys arranged in denominational groups, a plurality of multiplicand keys arranged in denominational groups, a plurality of contacts constructed and connected to represent products, means controlled by the multiplier and multiplicand keys for directing circuits through the contacts to represent a plurality of partial products, an accumulator, a plurality of devices having a uniform movement each time they move, a second set of contacts for each denominational order, and means controlled jointly by said devices and said second set of contacts for controlling entering of products on the accumulator.

11. A multiplying machine comprising in combination multiplier factor setting devices, multiplicand factor setting devices, electrical devices controlled by both of said setting devices for forming products, a driving mechanism for operating said electrical devices continuously during factor entering and computing operations, an accumulator, and mechanism actuated by the driving mechanism under the control of the electrical devices for entering the products into the accumulator.

12. In a computing system, means for setting up a multiplicand and a multiplier, a multiplying means associated with the multiplicand and multiplier setting up means including a plurality of different groups of commutator discs and each group further divided into a plurality of segments, and means controlled jointly by the multiplying means and the multiplicand and multiplier setting up means for accumulating the product of the computation.

13. In an electrical computing system, means for setting up a multiplicand and a multiplier, a multiplying means moved through a fixed distance associated with the multiplicand and multiplier setting up means, an accumulator, means for distributing the electrical impulses from the multiplying means to the accumulator to control its operation in accordance with a particular computation, and electromagnetic means for advancing said distributor after the completion of a multiplication of one digit of the multiplier with all digits of the multiplicand.

14. In an electrical computing system, means for setting up multi-digit factors, a multiplying device for controlling establishment in each cycle of operation of electrical circuits and emission of impulses in accordance with all digits of one factor and one digit of the other factor, means controlled by the electrical impulses thus established for accumulating the product of the computation, and means for preventing the establishment of circuits which would cause the accumulation of an incorrect product.

15. In an electrical computing system, means for setting up two multi-digit factors, a multiplying device for closing contacts representative of products of multiplication of a plurality of digits by one digit and for controlling the establishment of electrical impulses in accordance with the digits set up in the factor setting up means, means controlled by the electrical impulses thus produced for accumulating the product of the computation, and electrical relays controlled by one of the factor setting up means for preventing the establishment of circuits which would cause the accumulation of an incorrect product.

16. In a machine of the character described, the combination of a set of multiplier keys arranged in groups corresponding to decimal orders, a set of multiplicand keys arranged in groups corresponding to the grouping of the multiplier keys, a plurality of contacts arranged in decimal groups, a plurality of groups of contacts corresponding to various products, connections between said contacts and groups of contacts, a second plurality of sets of contacts grouped to correspond with a plurality of decimal orders, and electrical connections between the contacts in said second sets and the contacts corresponding to various products.

17. In a machine of the character described, a combination of a set of multiplier keys arranged in groups corresponding to decimal orders, a set of multiplicand keys arranged in groups corresponding to the grouping of the multiplier keys, a plurality of contacts arranged in decimal groups, groups of contacts representing various products, connections between the plurality of contacts and the groups of contacts, and a mechanism controlled by the product representing contacts for accumulating the numerical values of said products, and a distributor for directing circuits from the product representing contacts to said mechanism.

18. In a machine of the class described, the combination of multiplier keys arranged in groups corresponding to decimal orders, a set of multiplicand keys arranged in groups corresponding to the grouping of the multiplier keys, a plurality of contacts arranged in groups, groups of contacts corresponding to the multiplication tables, connections between the contacts arranged in groups and the contacts corresponding to the multiplication tables, a plurality of sets of contacts grouped to correspond with a plurality of decimal orders, electrical connections between the contacts in said sets of contacts and the contacts representing multiplication tables, and differential mechanism controlled by the sets of contacts.

19. In a computing system, multiplying means operable in identical cycles which in each cycle establishes electric contacts representative of the products of all digits of a notation by all digits of a notation, an accumulating means controlled by said multiplying means, and multiplier and multiplicand setting up means for selecting desired product representations from the multiplying means for transmission to the accumulating means.

20. In a computing system, a constantly rotating multiplying means which in each rotation closes contact representations of the partial products of all digits of a notation by all digits of a notation, an accumulator for receiving product representations from said multiplying means, and means comprising factor setting up devices for selecting product representations for transmission to the accumulator.

21. In a computing system, means for conditioning for operation circuits representing the products of every digit by itself and every other digit, and factor setting means for selectively completing predetermined ones of the conditioned circuits in accordance with the factors of a problem.

22. In a computing system, multiplier and multiplicand setting means, rotatable multiplying means which in each cycle of its rotation conditions for operation circuits representing the products of every digit by itself and every other digit, and an accumulator for receiving predetermined ones of said products as selected in accordance with the factors of a problem as set up in the multiplier and multiplicand setting means.

23. In a computing system, an accumulator, a multiplying mechanism, a multiplier and multiplicand setting means, electric circuits extending from the multiplier and multiplicand means and the multiplying means, and means responsive in a definite cyclic order for controlling the completion of the circuits from the multiplier and multiplicand setting means and the multiplying means to control the actuation of the accumulator.

24. In a computing system, multiplicand setting means, multiplier setting means, multiplying commutator, an electrically controlled accumulator, and circuits completed through the multiplicand setting means, the multiplier setting means and the commutator to the accumulator for controlling the accumulation of the result of a computation as set up in the multiplicand and multiplier setting means.

25. In an electrical multiplying system, means for setting up factors, a multiplying device moved through a number of cycles dependent upon the number of digits in a factor and adapted to be remotely positioned from the setting means for establishing circuits to conduct electrical impulses representing products in response to the setting means, an accumulator and a distributor for directing the electrical impulses from the circuits to the proper denominational columns of the accumulator.

26. In a device of the character described, a plurality of rows of multiplier keys, a plurality of rows of multiplicand keys, a plurality of contacts connected to represent multiplications, means controlled by the keys for selecting contacts and directing circuits through them to form products in a plurality of decimal orders, an accumulator, and distributor devices through which the circuits are directed for transmitting to the accumulator the products on the contact devices.

27. In a computing system, means for setting up a multiplicand and a multiplier, an electric multiplying means invariably operated in the same manner to close the same contacts for all factor values, an accumulating means, means controlled by said multiplier and multiplicand setting up means for completing circuits through said contacts, means for routing said circuits from the multiplying means to the accumulating means, and electrical means for controlling the operation of the routing means after the completion of the multiplication of the digits of the multiplicand by a digit of the multiplier.

28. In an electrical computing system, contact making means for setting up and storing a multi-digit multiplicand and a multi-digit multiplier, a normally ineffectively cycling multiplying means associated with the multiplicand and multiplier setting up means and operated through a number of effective computing cycles dependent upon the number of significant digits in a factor, an accumulator, means for distributing electrical impulses from the multiplying means to the accumulator to control its operation in accordance with a particular computation, and means for intermittently advancing the distributor.

29. In a computing system, means for setting up a multiplicand and a multiplier, a multiplying means associated with the multiplicand and multiplier setting means and invariably operated in the same manner for all the digits in the multiplier and multiplicand, an accumulator, means including a plurality of elements allotted to the several denominations of a computation, cycle controlling contacts and electromagnetic means controlled by the cycle controlling contacts for advancing the elements of said last mentioned means as the multiplication progresses.

30. In an electrical computing system operable in cycles, means for setting up a multiplicand and a multiplier, a normally ineffectively cycling multiplying means adapted to emit electrical impulses and associated with the multiplicand and multiplier setting up means and closing the same contacts each cycle for all the factors set up, the number of times said multiplying means is rendered effective to emit impulses being determined by the number of significant digits in one of the factors of the problem, an accumulator, means for distributing electrical impulses from the multiplying means to the accumulator to control its operation in accordance with a particular computation, and means for intermittently advancing the distributor.

31. In a multiplying recording machine, contact making means for setting up a multi-digit multiplier and a multiplicand, means for establishing circuits representing the product of a selected multiplier digit by all digits of the multiplicand, electrically controlled switching means for selecting successive multiplier digit setting up means one at a time to cause the selected multiplier digit setting up means to control the circuit establishing means to partially complete selected circuits, an accumulator, means for completing the selected circuits to the accumulator as determined by the multiplicand setting up means, and recording mechanism subsequently controlled by the accumulator for recording the product registered in the accumulator.

32. In a computing machine, an accumulator, means for actuating the accumulator, a plurality of electrical contact members representing computing tables for controlling the actuating means, and setting up elements for closing contacts for storing plural multi-digit factors of a problem and for controlling the operation of the contact members.

33. In a computing system, electrical computing tables, electrical circuits for conditioning the computing tables for a computation, an electrically controlled accumulator, electrical contacts operable for setting up all the factors of a problem before the beginning of computing operations, and means for selectively continuing predetermined electrical circuits from the computing tables to the accumulator through the factor setting contacts to control the accumulator to indicate the result in accordance with the factors of the problem.

34. In a computing recording system, a plurality of movable contacting devices comprising multiplication tables for each of the digits 1 to 9 inclusive and separately representing the units and tens parts of each of the products of the multiplication tables, means having electrical contacts for storing the digits of a multiplier and a multiplicand in denominational columns, an accumulating means having denominations orders, means for selecting and rendering operative predetermined ones of the contacting multiplying devices in succession as determined by the multiplier digits in the closed contacts of the storing means to establish circuits representing the units and tens parts of the products of the multiplier digits by all of the multiplicand digits, means for completing in a predetermined sequence the selected circuits as determined by the denominations of the multiplicand and multiplier digits to the proper denominational orders of the accumulator to control the accumulator so that it will indicate the products, and recording mechanism controlled by the accumulating means for recording the product registered in the accumulator.

35. In a computing system, means for partially completing for operation circuits representing by their time of completion the units and tens parts of the products of every digit of a notation by itself and every other digit of a notation during each and every cycle of the computing system means for storing factors, accumulating means, and means for selectively directing predetermined ones of the partially completed circuits to the accumulating means in accordance with the factors set up in the storing means to control the accumulation by the accumulating means of the units and tens parts of the partial products to obtain the final product.

36. In an electrical computing system, an accumulator, a denominational distributor, a multiplying means having a plurality of positions, setting means operable for storing a multiplicand and a multi-digit multiplier, and means for moving the multiplying means into positions to transmit electrical impulses representing products through the operated multiplier and multiplicand setting means and the distributor to the accumulator in a predetermined sequence.

37. In a multiplying machine, a plurality of set up devices divisible into groups and operable for storing the multiplicand and multiplier of a problem, multiplying mechanism including contacts and cooperating brushes operable uniformly in the same relation in all computing cycles, each cycle controlled jointly by all the multiplicand set up devices and one of the multiplier set up devices, controlling means operable to render the associated multiplicand set up devices effective to determine the effectiveness of the multiplying mechanism, selecting means operable automatically to select at each computing cycle the appropriate multiplier set up device, units and tens partial product circuits for the digits employed and arranged when the circuits are completed to transmit timed impulses at times in the machine cycle allocated to the digital values assigned to the circuits, accumulating means, column shift devices allocated to the various denominations and operable to connect the multiplying mechanism to the accumulating means in such a manner as to assign a denominational value to the partial products entered in the accumulating means in accordance with the denominations of the multiplier and multiplicand digits involved, and means for operating the multiplying mechanism to complete the units and tens partial product circuits to the accumulating means to transmit the timed electrical impulses thereto to control the accumulation thereby of the product in accordance with the operation of the set up devices, the controlling means, the selecting means and column shift devices.

38. In an electrical computing system, means for setting up a multiplicand and a multiplier, a source of electrical energy, means having multiplication table characteristics, means for completing circuits through the last mentioned means and through the multiplicand and the multiplier setting up means to transmit electrical impulses representing the product of the multiplication, said impulses controlling an indicating means which controls the making of a permanent record.

39. In a computing system, an electrical multiplying device including setting elements for a multi-digit multiplier and a multiplicand, an electrically controlled accumulator, and multiplying means movable a number of times dependent on the number of digits in the multiplier for completing circuits through the multiplier and multiplicand setting elements to the accumulator to control the accumulator whereby it will accumulate the product.

40. In a computing recording machine, a multiplier setting up means, means electrically connected to the multiplier setting up means for selecting multiplier digits one at a time, a source of electrical energy, a plurality of circuits having contacts, means for operating the contacts to complete circuits representing the product of the selected multiplier digit by each of the digits 1 to 9, inclusive, a multiplicand setting up means for selecting those of the circuits which will carry impulses representing the product of the selected multiplier digit by each of the multiplicand digits, an electrically controlled accumulator having denominational elements, means for directing the selected circuits through the proper elements of the accumulating mechanism as determined by the denominational orders of the selected multiplier digit and of the multiplicand digits, and means controlled by the accumulating mechanism for perforating a tabulating card with holes representing the accumulated product of the multiplier by the multiplicand.

41. A computing machine comprising plural sets of electrical contacts on which two multi-digit factors of a problem are set up, means controlled by said sets of contacts for emitting timed electrical impulses representing partial products of the multiplication of the factors, and a device controlled by the impulses to accumulate the result of the computation of the factors.

42. In a computing system, a plurality of movable devices comprising multiplication tables for each of the digits, accumulating means, means operable to store the factors of the problem, means for establishing circuits through the multiplying devices and factor storing means to control the accumulating means to indicate the product of the factors, and electrical means for controlling said last mentioned means to cause it to successively select in one continuous operation predetermined groups of the digits in the factors to render predetermined multiplying devices effective under control of the factor storing means.

43. In an electrical computing system, a source of electrical energy accumulating means, means for actuating the accumulating means, a plurality of separate groups of electrical contacting members and associated brushes for controlling said actuating means, the different groups representing computing tables for the digits 1 to 9, inclusive, and electrical contact means for storing the factors of a problem and for controlling connection through the source of electrical energy and various groups of the contacting members in continuous automatic succession.

44. In an electrical computing system, a device for closing electric circuits to set up multiplier and multiplicand factors, a source of electrical energy, contacting means controlled by the setting up device for closing contacts instantaneously to establish product circuits to emit electrical impulses related in time of emission to the value of each of the digits in the partial products of a computation, and means for maintaining the said product circuits closed after the contacts of the contacting means have opened.

45. In an electrical computing system, means for simultaneously storing two factors of a mathematical problem, a multiplying means, an accumulating means electrically connected therewith and controlled thereby, electrical circuits controlled by the setting up means for connecting the multiplying means with the setting up means for the two factors, and means for actuating the multiplying means to control the accumulating means in accumulating the result of a computation.

46. In a computing recording system, a plurality of circuits representing results of computing tables, two sets of factor storing contacts for storing multi-digit multiplier and multi-digit multiplicand and for selectively completing predetermined ones of the circuits in succession in accordance with the factors of a problem, electrically controlled means for conditioning the selected circuits for operation, means controlled by the completed circuits for accumulating the result of the problem, and means controlled by the accumulating means for recording the accumulated result.

47. In a computing machine, a multiplication effecting means comprising a commutator with conducting surfaces thereon, stationary brushes cooperating with said surfaces, factor entry receiving means, and devices controlled by said last means for selectively completing circuits through said stationary brushes.

48. A multiplying machine with a plurality of factor entry means, impulse circuits, means including a commutator and cooperating brushes permanently fixed relatively thereto for emitting impulses thereon wholly without denominate value as emitted at the emitting means but having a differential time of emission which represents abstract numerical values only as the impulses are emitted upon said circuits and including in combination electrical contacts controlled by all factor entry means for selectively controlling the emission of impulses, and an accumulator type of receiving means directly controlled by the emitted impulses and adapted to form numerical representations of products of multi-denominational character.

49. A record accounting machine with factor entry means, multiplying means controlled thereby and including a set up means for products computed by the machine, means for controlling the product set up means to cause the latter to accumulate a series of separate products, and means controlled by the product set up means for punching upon a record such summary of products.

50. In a computing machine having factor receiving means, a multiplication effecting means comprising a plurality of sets of contact elements one for each digit of a notation and members movable relatively to said sets, said movable members having means thereon establishing contact relations and having multiplication table characteristics and adapted by their movement in cooperation with the contact elements to emit one or more differentially timed impulses, and means controlled by said receiving means for causing selection of impulses which are representative of components of products.

51. A computing machine with a multiplication effecting means which is continuously movable during calculations and adapted to emit differential timed impulses representative of partial products of one or more denominations, one impulse being coordinated to one individual denomination only of the partial products and another to another individual denomination, and a receiving device of multi-denominational type coordinated in timed operation to the aforesaid means for receiving the individual denominational and timed impulses and for setting actual products.

52. A multiplying machine which includes in combination, an accumulator which is adapted for item entry control by differentially timed impulses and which accumulator is adapted to accumulate partial products, an impulse emitter having contacts and brushes for sending impulses to the accumulator and controlling its item entering operations, said emitter and accumulator being coordinated for synchronous operation so that when one entering cycle is made by the accumulator one rotative cycle of coordinate extent is made by the emitter, multi-digit factor entry means having contacts for setting up both factors of the multiplying computation each having associated therewith impulse selecting means, said emitter cooperating with the selecting means for one entered factor so that the emitter tends to emit a plurality of differentially timed impulses which would by their timing of emission if emitted, represent a plurality of partial products, said other factor entry means and associated selecting means being adapted to select one or more of the aforesaid partial product representing impulses and permit the flow of said impulse or impulses to the accumulator to control its operation.

53. A multiplying machine which effects multiplication by the use of partial products, having sets of contacts which are closed to enter factors, accumulating means for the partial products, impulse circuits, and multiplying means from which differential timed impulses representative of products are emitted upon said circuits, said impulses as emitted upon said impulse circuits by said means having a numerical significance only and no denominational significance and the said impulse circuits likewise having no denominational significance, the closure of the impulse circuits for said emission of said impulses being conjointly controlled by the factor entry contacts, representing both factors, and being denominationally allocated by one set of said factor entry contacts which are of multi-denominational character.

54. The invention set forth in claim 53 in which a column shifting means is provided cooperating with the other set of factor entry contacts and with electrically controlled means for automatically calling the same into operation at each entering cycle of operation of the accumulating means of the machine.

55. A cyclically operating multiplying machine with an impulse emitter including rows of contacts and cooperating brushes equal in number to the rows of contacts, accumulating means, driving means therefor, means for imparting one rotative cycle to the emitter and at the same time imparting a rotative cycle of coordinate extent to accumulator driving means, factor entry means for two factors, at least one of said factor entry means being of multi-denominational form, lines leading from the accumulating means to the emitter, and two selectors in said lines, one selector being under the control of the factor entry means for one factor and the other selector being under the control of a cyclically operating advancing means.

56. A computing machine with multi-digit sets of contacts for receiving two entries, and means for emitting digital timed impulses, which impulses each by its instant emission in a particular time in a computing cycle represents the component digital value of a multiplication of the entries, and means controlled by the entry receiving contacts and effective for the selection of circuits over which impulses are to be transmitted.

57. A calculating machine including in combination, impulse emitting means comprising members which make contact with each other for creating differentially timed impulses of the same duration according to the numbers of a notation involved in the calculation means for controlling emission of progression impulses according to a progression or progressions based upon a digit or digits of one of the factors of a computation, and selecting means for selecting one or more of said progression impulses and for coordinating such selected impulses to a proper denominational value in accordance with the digits of the other factor of the computation.

58. A calculating machine with factor entry means, accumulating means, a plurality of contacts all of which close in the same manner during each cycle to emit impulses representative of partial product results irrespective of denominational values and magnitudes of entered factors, means for coordinating such created partial product impulses into progressions based upon one entered factor, means for selecting and allocating to denominational values such impulses as are coordinated to another factor, and means for transmitting such selected impulses to control the accumulating means.

59. In an electrical multiplying machine, an accumulator, a denominational distributor, contacts for setting up a multiplicand and a multiplier, an emitter including contactors and brushes, and means for rotating the emitter to send product impulses over circuits through the setting up contacts for multiplier and multiplicand, through the distributor and the accumulator to effect an indication of the product.

60. In an electrical multiplying machine, a plurality of accumulator wheels, power means for rotating the wheels, electromagnets for individually controlling when each of said wheels is to be connected to the power means, a denominational distributor, an emitter including contacts in predetermined positions and fixed brushes cooperating therewith, means for setting up two factors to be multiplied, means for actuating the emitter to establish at predetermined instants differentially timed and momentary impulses one for each digit over product circuits through the setting up means for both factors and through the distributor to actuate the electromagnets, and means for maintaining the actuated wheels in operation for a predetermined time after the termination of the momentary impulses.

61. An accounting machine having a series of conductors one for each digit of a notation over which differentially timed impulses are adapted to flow, a series of progression conductors over which the impulses flow, a series of denominational conductors over which the impulses flow, and switching means to control the flow of impulses from the digital conductors to the progressive conductors and other selector devices intermediate the digital conductors and the denominational conductors to control the flow of impulses from the first mentioned to the latter mentioned conductors.

62. The invention set forth in claim 61 in which the switching means includes a plurality of individually selectively operable devices.

63. The invention set forth in claim 61 in which a supplementary set of denominational conductors are provided and in which electromagnetic switching means control the flow of impulses thereto from the other denominational conductors and control the denominational value of the transmitted impulses.

64. In an accounting machine in combination, a series of conductors one for each digit of a notation and having the capability of having impressed thereon and individually on each conductor electrical impulses which are relatively differentially timed with respect to each other according to the digits of a notation, factor entry contacts associated with said conductors, a series of switching devices associated with the conductors to coordinate their transmission to said factor entry contacts according to a progression and selectively operable electromagnetic means for controlling the operation of some of said switching devices.

65. The invention set forth in claim 64 in which a factor entry set-up device is provided and in which said factor entry set-up device controls the selectively operable electromagnetic means.

66. An accounting machine having a series of digit conductors for each digit of a notation, over which differentially timed impulses are adapted to flow, a series of progression conductors over which the impulses flow and a series of denominational conductors over which the impulses flow to a receiving device, switching means comprising a cyclically operable means and selectively operable devices to control the flow of impulses through the digit conductors and the progression conductors, multiplicand selector devices and supplemental electromagnetic switching means to control the flow of impulses from the selector devices to the denominational conductors, said selector devices making a first denominational allocation of impulse flow according to the denominations of the multiplicand and said supplemental switching means making a further denominational allocation of impulse flow according to the order of the multiplier being used.

67. In a multiplying machine, means for entering factors, multiplying means, an entry receiving and retaining device controlled by the multiplying means and comprising a plurality of elements each pertaining to a separate order, a recording device for recording data standing on the receiving device, means rendered effective after the completion of a multiplication for emitting a single series of impulses representative of different data, and means associated with the factor entering means and with each element of the entry receiving device for selecting for control of the recording device only such impulses as correspond to data standing on the particular element of the receiving and retaining device and to data standing on the factor entering means.

68. In an electrical computing system, a source of electrical energy, means for setting up digits, a plurality of computing devices having elements representing computations of a plurality of digits, a plurality of circuits connecting the setting up means with the elements on the computing devices, means for operating the computing devices to complete the circuits closed by the setting up means to transmit electrical impulses representing the result of a computation, accumulating means, means for routing the electrical impulses into proper denominational orders of the accumulating means, recording means controlled by electric circuits from the accumulating means and including selecting means controlled by electrical impulses, a plurality of perforating members cooperating with said selecting means, and means for actuating the selecting means to select the perforating members whereby the result of the computation is perforated in a statistical record card.

69. In a multiplying machine, plural factor entry means, readout means for one of said factor entry means, multiplying means including multiplying relays selectively controlled by the readout means in accordance with factor digit values, an accumulator, and means for automatically carrying out the computation by the multiplying means under control of said plural factor entry means to indicate the product in the accumulator.

70. In a cyclically operating computing machine having in combination with plural factor entry means, means including contacts which are all closed during every cycle of operation to represent a set of numbers, and means cooperating therewith and with one of the factor entry means for partially completing circuits through the aforesaid contacts in accordance with a progression and with the other said factor entry means for selecting particular representations from said progression.

71. In a computing machine factor entry means, a result accumulator having plural denominational orders, a merging means for multiplying entered factors, said merging means being timed for operation in synchronism with the result accumulator and including means for emitting to said accumulator momentary timed impulses, one for each partial product of the result, to control the accumulation of a final result.

72. A multi-denominational multiplying device comprising circuit controllers for the multiplier, circuit controllers for the multiplicand, a cyclically timed impulse emitter cooperating with both of the aforesaid controllers and having provisions to emit in one cycle thereof a plurality of differtially timed impulses which are representative of the products of a single digit factor only and a multi-denominational factor, said circuit controllers and cyclically timed impulse emitter operating upon another cycle of operation of the cyclically timed impulse emitter for computation which involves only another single digital factor, and an electric cycle controller for determining the time in a cycle when the impulse emitter is rendered effective.

73. In a power driven multiplying machine, an accumulator, electrical contacts for concurrently storing multi-denominational multiplier and multiplicand factors, multiplying devices operable in cycles to multiply the multiplicand factor by a digit of the multiplier factor during a single cycle, and means for automatically and by the power operation of the machine rendering the multiplying devices effective in one continuous operation to multiply the multiplicand by successive digits of the multiplier to obtain the product of the factors in the accumulator under the control of the electrical contacts of the factor storing means.

74. In a multiplying machine, an accumulator, multiplying devices, contacts for setting up multi-digit multiplier and multi-digit multiplicand factors, means for controlling the multiplying devices in accordance with a setup multi-digit multiplicand and successive digits of the multiplier to form partial products by establishing circuits through the said contacts, multiplying devices, and accumulating means, and means controlled by the accumulating means when a complete product is accumulated thereon for recording said product in the form of identifying marks upon a record.

75. A calculating machine for performing multiplying computations including multiplicand and multiplier receiving devices, multiplying devices controlled by the receiving devices, an accumulator for accumulating products under control of the multiplying devices, a recorder, means for automatically reading out the product which is formed on the accumulator into the recorder, means for actuating the recorder after the product is read out and means for resetting the multiplicand and multiplier receiving devices during the time of the cycle when the recorder is operated.

76. In an electrical multiplying machine, electrical means for storing a multi-denominational multiplicand factor, electrical means for storing a multi-denominational multiplier factor, a plurality of sets of contacts representing the products of multiplication tables, an accumulator, a denominational distributing means electrically connected to the accumulator, multiplying control electromagnets selectively called into action under control of the multiplier factor storing means for controlling the establishment of circuits through the product representing contacts to transmit product impulses through the distributing means to the accumulator, and a recorder electrically controlled from the accumulator for making a permanent record of the result.

77. In a computing recording machine, a multiplier setting up means for each denominational order, means for selecting and rendering effective the denominational order setting up means for multiplier digits one at a time to control the multiplication, a source of electrical energy, a plurality of circuits having contacts, means for operating the contacts to condition the circuits representing the product of the selected multiplier digit by each of the digits one to nine inclusive, a multiplicand setting up means for selecting those of the conditioned circuits which will carry impulses representing the product of the selected multiplier digit by each of the multiplicand digits, an electrically controlled accumulator having denominational elements, means for directing the selected circuits through the proper elements of the accumulator as determined by the denominational orders of the selected multiplier digit and of the multiplicand digits, and means electrically controlled by the accumulator for perforating a tabulating card with holes representing the accumulated product of the multiplier by the multiplicand.

78. An accounting machine including a plurality of accumulating elements and a driving clutch mechanism for each, operating devices for said clutch mechanism for effecting operation of said clutch mechanisms at differential times for entering items during item entering operations, further means also including said devices for resetting said accumulating elements during resetting operations, machine controlled devices for effecting unclutching of said clutch mechanisms for terminating entering operations and devices controlled by each element for terminating resetting operations at differential times.

79. A multiplying machine including two sets of multi-digit factor entering and receiving contacts, an accumulator, a plurality of normally ineffective contact making means for creating from a source of electric energy a series of timed impulses common to the various orders of the accumulator, means for rendering predetermined ones of the contact making means effective to establish progressions of timed impulses as controlled by the closed contacts of one of the factor entry and receiving means, and means for selectively directing the impulses into the proper denominational orders of the accumulator in accordance with the contacts closed in the other factor entry and receiving means.

80. In a cyclically operating multiplying machine, a normally ineffectively cycling power driven multiplying means, and other power driven cyclically operated devices for rendering said multiplying means effective at predetermined times in multiplying cycles to form a succession of partial products.

81. A reset device for an accounting machine which includes a rotatable accumulator element, means for actuating the accumulator element, means for initiating operation of said actuating means, and means for interrupting operation of said actuating means when the accumulator element is in zero position comprising a pair of cooperating electrical contacts, one of which rotates concurrently with the accumulator element.

HAROLD GLENN JOHNSTONE.
CHARLES WILLIAM ROBBINS.